United States Patent
Mitsuoka et al.

(10) Patent No.: US 8,609,264 B2
(45) Date of Patent: Dec. 17, 2013

(54) BIAXIALLY ORIENTED POLYESTER FILM AND MAGNETIC RECORDING MEDIUM

(75) Inventors: Hideto Mitsuoka, Tokyo (JP); Takuji Higashioji, Tokyo (JP); Masato Horie, Tokyo (JP); Yukari Nakamori, Tokyo (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/320,340

(22) PCT Filed: May 11, 2010

(86) PCT No.: PCT/JP2010/057940
§ 371 (c)(1), (2), (4) Date: Dec. 15, 2011

(87) PCT Pub. No.: WO2010/131643
PCT Pub. Date: Nov. 18, 2010

(65) Prior Publication Data
US 2012/0114977 A1    May 10, 2012

(30) Foreign Application Priority Data

May 15, 2009  (JP) ................. 2009-118421
Aug. 4, 2009  (JP) ................. 2009-181271

(51) Int. Cl.
*G11B 5/706*    (2006.01)
*B32B 3/00*    (2006.01)

(52) U.S. Cl.
USPC ......... 428/847.2; 428/480; 428/910; 360/134

(58) Field of Classification Search
USPC ............... 428/220, 800, 847.2, 847.4, 847.6, 428/846.9, 832, 844, 842, 336, 847, 848.4, 428/838, 910; 360/134
See application file for complete search history.

(56) References Cited

U.S. PATENT DOCUMENTS

2002/0102438 A1* 8/2002 Saito et al. ................. 428/846.9
2005/0227124 A1* 10/2005 Merton ........................ 428/844
(Continued)

FOREIGN PATENT DOCUMENTS

JP    2001-323146 A    11/2001
JP    2002-249660 A     9/2002
(Continued)

OTHER PUBLICATIONS

Kubota et al, JP 2005-163020, Jun. 23, 2005, machine translation.*
(Continued)

*Primary Examiner* — Kevin M. Bernatz
*Assistant Examiner* — Louis Falasco
(74) *Attorney, Agent, or Firm* — DLA Piper LLP (US)

(57) ABSTRACT

[Problem to be solved] To provide a biaxially oriented polyester film, which suffers only small dimensional changes due to changes in environmental temperature and humidity and due to storage, ensures low error rates, and can little abrade the magnetic head and the magnetic tape, when used as a base film of a magnetic recording medium, and which can be used to provide a high density magnetic recording medium excellent in running durability.
[Solution] A biaxially oriented polyester film having an islands-in-sea structure, an average island domain size of 30 to 200 nm, and a coefficient of hygroscopic expansion of 0 to 6.0 ppm/% RH at least either in the machine direction or in the transverse direction of the film.

11 Claims, 1 Drawing Sheet

(56) References Cited

U.S. PATENT DOCUMENTS

| | | | |
|---|---|---|---|
| 2007/0230054 A1* | 10/2007 | Takeda et al. | 360/134 |
| 2007/0281186 A1* | 12/2007 | Yoshida et al. | 428/847.4 |
| 2008/0118730 A1* | 5/2008 | Yu et al. | 428/220 |
| 2009/0297888 A1* | 12/2009 | Horie et al. | 428/846.4 |
| 2010/0167092 A1* | 7/2010 | Kobayashi et al. | 428/847.2 |

FOREIGN PATENT DOCUMENTS

| | | | | |
|---|---|---|---|---|
| JP | 2003-246870 A | 9/2003 | | |
| JP | 2004-091753 A | 3/2004 | | |
| JP | 2004-107471 A | 4/2004 | | |
| JP | 2004-123863 A | 4/2004 | | |
| JP | 2005-163020 A | 6/2005 | | |
| WO | 2007091381 | * | 8/2007 | G11B 5/733 |

OTHER PUBLICATIONS

Ma, JP 2004-107471, Apr. 2004, machine translation.*

Hitomu Saito et al. "Supercritical Fluid Technology and Its Applications" ("Polymer Processing"), *Journal of the Japan Society of Polymer Processing*, vol. 15, No. 6, pp. 382-385 (2003), ten (10) page English translation.

* cited by examiner

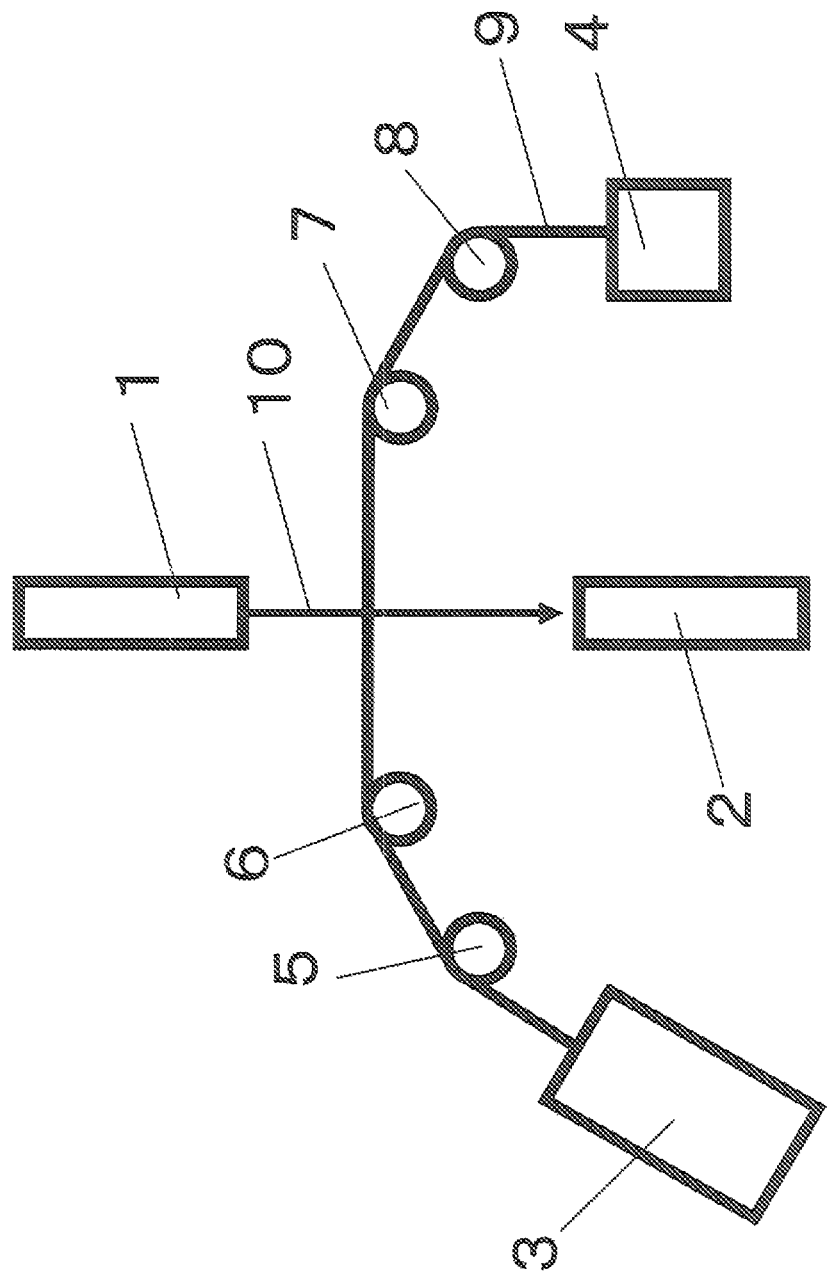

BIAXIALLY ORIENTED POLYESTER FILM AND MAGNETIC RECORDING MEDIUM

TECHNICAL FIELD

The present invention relates to a biaxially oriented polyester film excellent in dimensional stability. The biaxially oriented polyester film of this invention can be suitably used for magnetic recording media, electric insulation, capacitors, circuit materials, solar cell materials, etc. The biaxially oriented polyester film of this invention suffers only small dimensional changes due to changes in environmental temperature and humidity, ensures low error rates and can little abrade the magnetic head and the magnetic tape, especially when used as a base film of a magnetic recording medium among the abovementioned applications, and can also be used to provide a high density magnetic recording medium excellent in running durability.

BACKGROUND ART

Biaxially oriented polyester films are excellent in thermal properties, dimensional stability, mechanical properties, electric properties, heat resistance and surface properties, and therefore are used for various industrial materials such as magnetic recording media, electric insulation, capacitors and packaging. In particular, it is well known that biaxially oriented polyester films are useful as substrate of magnetic recording media, etc.

In recent years, magnetic recording media such as magnetic tapes are required to have thinner base films and allow higher density recording since machines and materials are required to be lighter in weight, smaller in size and larger in capacity. In order to allow higher density recording, it is effective to employ shorter recording waves and smaller recording tracks.

However, a smaller recording track has a problem that the recording track is likely to shift owing to the deformation of the tape caused by the heat during tape running and by the changes of temperature and humidity during tape storage. Consequently there is a growing demand for a base film with higher dimensional stability even in the tape use environment and the tape storage environment. Further, there is also a growing demand for a magnetic tape with higher running durability.

Furthermore, a thinner film is insufficient in mechanical strength, hence less stiff and likely to elongate in the machine direction and likely to contract in the transverse direction. Consequently it has such problems that the track shifting occurs, that the head touch is adversely affected to lower the electromagnetic conversion properties, and that the head and the tape are abraded.

From these points of view, aromatic polyamides more excellent in strength and dimensional stability and higher in stiffness than biaxially oriented polyester films are used sometimes. However, since the stiffness of the aromatic polyamides is too high, the head may be abraded. Further, since the aromatic polyamides are expensive, it is not realistic to use the aromatic polyamides as substrate of general-purpose recording media. Polyester films formed from polyethylene terephthalate, polyethylene naphthalate and the like are also used to develop substrate with higher strength for magnetic recording media using stretching techniques. However, it is still difficult to satisfy the severe demand for dimensional stability to temperatures and humidities.

In recent years, in order to enhance the heat resistance of a polyester film, methods of blending a polyester and another thermoplastic resin are studied.

A biaxially oriented polyester film obtained by mixing a polyester and a thermoplastic resin other than a polyester is proposed as a film excellent in running properties and scratch resistance (for example, patent document 1). However, this technique is intended to improve the scratch resistance of the surface of a film, and is different from the present application in technical idea. Actually the technique described in the document cannot enhance mechanical properties or dimensional stability. Further, the document does not disclose the mixing method important for enhancing the dimensional stability of a film as disclosed in the present application, when mixing a thermoplastic resin other than a polyester into a polyester, or the particular film forming method for preparing a film using three resin components such as a polyimide described in the examples of the present application.

Further, proposed is a film consisting of a polyester, a polyimide and a polymer nano-compatible with the polyimide, in which an aromatic polyether ketone or the like is used as the polymer nano-compatible with the polyimide, to enhance heat resistance and thermal dimensional stability (for example, patent document 2). However, in this technique, the amounts of the polyimide and the polymer nano-compatible with the polyimide, mixed with the polyester are so large that the molecular chains may not be able to be oriented effectively by stretching or the like. For example, in the case where the film is used for a higher density magnetic recording medium or the like, the film may not be able to satisfy the severe demand for the dimensional stability to temperatures and humidities, etc. Further, foreign object owing to the non-molten material is likely to be generated in the film, to roughen the surface, and in the case where the film is used, for example, for a magnetic recording medium, electromagnetic conversion properties may become poor.

Moreover, a resin composition composed of a polyimide and a thermoplastic resin other than a polyimide is proposed (for example, patent document 3). However, for example, any specific method for applying the resin composition to a polyester film is not disclosed at all.

PRIOR ART DOCUMENTS

Patent Documents

Patent document 1: JP 2001-323146 A
Patent document 2: JP 2004-123863 A
Patent document 3: JP 2002-249660 A

SUMMARY OF THE INVENTION

Problems to be Solved by the Invention

The object of this invention is to solve the abovementioned problems by obtaining a biaxially oriented polyester film excellent in stiffness and dimensional stability. In particular, the object is to provide a biaxially oriented polyester film, which suffers only small dimensional changes due to changes in environmental temperature and humidity and due to storage, ensures low error rates, and can little abrade the magnetic head and the magnetic tape, when used as a base film of a magnetic recording medium, and which can be used to provide a high density magnetic recording medium excellent in running durability.

Means for Solving the Problems

This invention for achieving the abovementioned object has the following features.

(1) A biaxially oriented polyester film having an islands-in-sea structure, an average island domain size of 30 to 200 nm, and a coefficient of hygroscopic expansion of 0 to 6 ppm/% RH at least either in the machine direction or in the transverse direction of the film.

(2) A biaxially oriented polyester film, according to the abovementioned (1), wherein the haze value inside the film is 0 to 50%.

(3) A biaxially oriented polyester film, according to the abovementioned (1) or (2), wherein the mean value of the refractive index in the machine direction and the refractive index in the transverse direction is 1.600 to 1.850.

(4) A biaxially oriented polyester film, according to any one of the abovementioned (1) through (3), wherein the roughness Ra of the film surface at least on one side is 0.5 to 20 nm.

(5) A biaxially oriented polyester film, according to any one of the abovementioned (1) through (4), wherein the ten-point mean roughness Rz of the film surface at least on one side is 50 to 300 nm.

(6) A biaxially oriented polyester film, according to any one of the abovementioned (1) through (5), wherein the coefficient of thermal expansion at least either in the machine direction or in the transverse direction is −5.0 to 8.0 ppm/° C.

(7) A biaxially oriented polyester film, according to any one of the abovementioned (1) through (6), which has island domains with a diameter of 30 to 200 nm, and the mean value of the ratios of the major axes to the minor axes (each ratio=major axis/minor axis) of the island domains is 1 to 20.

(8) A biaxially oriented polyester film, according to the abovementioned (7), wherein the island domains with a diameter of 30 to 200 nm are composed of an amorphous resin.

(9) A biaxially oriented polyester film, according to the abovementioned (8), wherein the glass transition temperature of the amorphous resin forming the island domains with a diameter of 30 to 200 nm is higher than 210° C. to 400° C.

(10) A biaxially oriented polyester film, according to the abovementioned (8) or (9), wherein the amorphous resin forming the island domains with a diameter of 30 to 200 nm contains at least one resin selected from the group consisting of polyetherimides, polyimides and polyamideimides.

(11) A biaxially oriented polyester film, according to any one of the abovementioned (1) through (10), which contains at least two polyetherimides.

(12) A biaxially oriented polyester film, according to any one of the abovementioned (1) through (11), which has island domains with a diameter of 1 nm to smaller than 30 nm.

(13) A biaxially oriented polyester film, according to the abovementioned (12), wherein the island domains with a diameter of 1 nm to smaller than 30 nm contain a polyetherimide.

(14) A biaxially oriented polyester film, according to any one of the abovementioned (1) through (13), which contains a crystalline polyester, the polyester being at least one polyester selected from the group consisting of polyethylene terephthalate, polyethylene-2,6-napthalate and modification products thereof.

(15) A magnetic recording medium using the biaxially oriented polyester film set forth in any one of the abovementioned (1) through (14).

Effects of the Invention

This invention can provide a biaxially oriented polyester film excellent in stiffness and dimensional stability, which can be suitably used for magnetic recording media, electric insulation, capacitors, circuit materials, solar cell materials, etc. The biaxially oriented polyester film of this invention suffers only small dimensional changes due to changes in environmental temperature and humidity, ensures low error rates and can little abrade the magnetic head and the magnetic tape, especially when used as a base film of a magnetic recording medium among the abovementioned applications, and can also be used to provide a high density magnetic recording medium excellent in running durability.

BRIEF DESCRIPTION OF THE DRAWING

FIG. 1 is a typical view showing a sheet width measuring instrument used for measuring the width dimension.

MODES FOR CARRYING OUT THE INVENTION

The biaxially oriented polyester film of this invention contains a polyester as a main component. In this description, "containing a polyester as a main component" means that the polyester accounts for 50 mass % or more based on the total amount of all the polymers constituting the film. If the polyester content is less than 50 mass %, productivity tends to decline. It is preferred that the polyester content is 80 mass % or more based on the total amount of all the polymers constituting the film. More preferred is 85 mass % or more.

It is preferred that the polyester constituting the biaxially oriented polyester film of this invention is a polymer obtained by using an acid component such as an aromatic dicarboxylic acid, alicyclic dicarboxylic acid or aliphatic dicarboxylic acid, and a diol component as component units (polymerization units).

Examples of the aromatic dicarboxylic acid used as a component include terephthalic acid, isophthalic acid, phthalic acid, 1,4-naphthalenedicarboxylic acid, 1,5-naphthalene-dicarboxylic acid, 2,6-naphthalenedicarboxylic acid, 6,6'-(alkylenedioxy)di-2-naphthoic acids, 4,4'-diphenyldicarboxylic acid, 4,4'-diphenyletherdicarboxylic acid, 4,4'-diphenylsulfonedi-carboxylic acid, etc. Among them, terephthalic acid, phthalic acid and 2,6-naphthalene-dicarboxylic acid can be preferably used. As for the 6,6'-(alkylenedioxy)di-2-naphthoic acids, alkylenes with 2 to 10 carbon atoms are preferred, and 6,6'-(ethylenedioxy)di-2-naphthoic acid, 6,6'-(trimethylenedioxy)di-2-naphthoic acid and 6,6'-(butylenedioxy)di-2-naphthoic acid, etc. can be enumerated. Examples of the alicyclic dicarboxylic acid used as a component include cyclohexanedicarboxylic acid, etc. Examples of the aliphatic dicarboxylic acid used as a component include adipic acid, suberic acid, sebacic acid, dodecanedioic acid, etc. Any one of these acids can be used alone or two or more of them can also be used together.

A 6,6'-(alkylenedioxy)di-2-naphthoic acid can also be used as a main component, but it is preferred that the compound is copolymerized with another aromatic polyester. A preferred amount of the 6,6'-(alkylenedioxy)di-2-naphthoic acid copolymerized is 5 to 50 mol %. A more preferred range is 10 to 40 mol %, and a further more preferred range is 15 to 30 mol %. It is preferred that the melting point of the polyester copolymerized with the 6,6'-(alkylenedioxy)di-2-naphthoic acid is 220 to 260° C. A more preferred range is 230 to 250° C., and a further more preferred range is 235 to 245° C. It is preferred that the glass transition temperature of the polyester copolymerized with the 6,6'-(alkylenedioxy)di-2-naphthoic acid is 100 to 140° C. A more preferred range is 110 to 130° C., and a further more preferred range is 115 to 125° C. Furthermore, it is preferred that the melt crystallization peak temperature of the polyester copolymerized with the 6,6'-(alkylenedioxy)di-2-naphthoic acid is 140 to 180° C. A more preferred range is 150 to 170° C., and a further more preferred range is 155 to 165° C.

Examples of the diol used as a component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2'-bis(4'-β-hydroxyethoxy-phenyl)propane, etc. Among them, ethylene glycol, 1,4-butanediol, 1,4-cyclohexanedimethanol, diethylene glycol, etc. can be preferably used. Especially preferably, ethylene glycol or the like can be used. Any one of these diols can be used alone or two or more of them can also be used together.

The polyester can also be copolymerized with a monofunctional compound such as lauryl alcohol or phenyl isocyanate, or a trifunctional compound such as trimellitic acid, pyromellitic acid, glycerol, pentaerythritol, 2,4-dioxybenzoic acid or the like can also be copolymerized to such an extent that the polymer remains substantially linear without excessively branching or being crosslinked. Further, in addition to the acid and the diol used as components, an aromatic hydrocarboxylic acid such as p-hydroxybenzoic acid, m-hydroxybenzoic acid, 2,6-hydroxynaphthoic acid, p-aminophenol, p-aminobenzoic acid or the like can also be copolymerized if the amount is so small that the effects of this invention are not impaired.

The copolymerization rates of a polymer can be examined using NMR technique (nuclear magnetic resonance technique) and FT-IR microscopy (Fourier transform infrared microscopy).

It is preferred that the biaxially oriented polyester film of this invention contains a crystalline polyester, since especially excellent productivity, mechanical properties, thermal properties, electric properties, surface properties and heat resistance can be imported. It is preferred to contain at least one polyester selected from the group consisting of polyethylene terephthalate (hereinafter may be referred to as PET), poly(ethylene-2,6-naphthalene-dicarboxylate (polyethylene-2,6-naphthalate)) (hereinafter may be referred to as PEN), and modification products thereof. Of course, a copolymer with PET or PEN or a polymer alloy with another thermoplastic resin can also be used. In this description, a polymer alloy means a multi-component polymer, and can also be a block copolymer obtained by copolymerization, or a polymer blend obtained by mixing, etc. It is preferred that the biaxially oriented polyester film of this invention contains at least one of these polymers.

It is preferred that the biaxially oriented polyester film of this invention contains at least two polyetherimides. The reason is that if the biaxially oriented polyester film of this invention contains at least two polyetherimides, excellent heat resistance, high orientation and excellent surface properties can be easily and simultaneously imparted. Examples of the polyetherimides are described later.

The biaxially oriented polyester film of this invention has an islands-in-sea structure.

If the film of this invention has an islands-in-sea structure, the film can be highly oriented in the machine direction and in the transverse direction while maintaining dimensional stability. Therefore, mechanical properties can also be simultaneously enhanced. Consequently if the film is used as a base film of a magnetic recording medium, the film has such advantages as small dimensional changes due to changes in environmental temperature and humidity and during storage and low error rates, and therefore is especially suitable for use as the base film.

In order to further enhance the abovementioned effects, it is important that the island domains are made to function as constraining sites, to exhibit the action of enhancing the molecular chain orientation of the sea domain at the time of stretching. Accordingly, it is preferred that the average island domain size is 30 to 200 nm.

If the average island domain size is smaller than 30 nm, it is difficult that the island domains function as constraining sites for the sea domain, and when the film is stretched, the molecular chains may not be able to be more highly oriented in the machine direction and/or in the transverse direction. Consequently the dimensional stability and mechanical properties of the biaxially oriented polyester film may decline, and in the case where the film is used in a magnetic recording medium, the dimensional changes due to changes in environmental temperature and humidity and after storage and error rates may becomes large.

For example, in an islands-in-sea structure in which a polyester forms the sea domain while a resin different from that of the sea domain forms the island domains, the glass transition temperature (hereinafter may be referred to as "Tg") of the resin forming the island domains becomes lower than the Tg of the resin in the case where the resin exists alone, if the average island domain size becomes smaller. If the average island domain size is smaller than 30 nm, the Tg of the island domains becomes sufficiently low, and the island domains do not function as the constraining sites for the sea domain any more. Further, the island domains may be deformed being stressed while the film is stretched.

Meanwhile, if the average island domain size of the biaxially oriented polyester film of this invention is larger than 200 nm, the breaking of the film caused by the island domains is caused frequency while the film is formed, to lower productivity. Further, at the time of stretching, the molecular chains cannot be sufficiently oriented, and the surface of the film is roughened to form voids. If the film is used, for example, in a magnetic recording medium, the electromagnetic conversion properties decline, and the effects of this invention are hard to obtain.

It is more preferred that the average island domain size of the biaxially oriented polyester film of this invention is 50 to 150 nm.

In this description, the average island domain size is the mean value of the equivalent circle diameters obtained on multiple observed surfaces and can be obtained by the following measuring method.

At first, a cut surface of the film is observed and photographed at an accelerating voltage of 100 kV using a transmission electron microscope at a magnification of 20,000×, and the photo is inputted as an image into an image analyzer. Arbitrary 100 island domains are selected and image-processed as required to obtain the island domain sizes. The number average of the sizes is calculated. A concrete method is as described below.

A film is cut (A) in the direction parallel to the machine direction and perpendicular to the film surface, (B) in the direction parallel to the transverse direction and perpendicular to the film surface, and (C) in the direction parallel to the film surface, to prepare extra-thin section samples. In order to clarify the contrast of the island domains, osmic acid, ruthenic acid or the like may also be used for staining. A cut surface is observed at an accelerating voltage of 100 kV using a transmission electron microscope (H-7100FA produced by Hitachi), and a photo is taken at a magnification of 20,000×. The obtained photo is inputted as an image into an image analyzer. Arbitrary 100 island domains are selected and image-processed as required, to obtain the island domain sizes as described below. The longest lengths (la) of the respective island domains found in the cut surface of (A) in the film thickness direction and the longest lengths (lb) of the respective island domains in the machine direction, the longest lengths (lc) of the respective island domains found in the cut surface of (B) in the film thickness direction and the longest lengths (ld) of the respective island domains in the transverse direction, and the longest lengths (le) of the respective island domains found in the cut surface of (C) in the machine direction and the longest lengths (lf) of the respective island domains in the transverse direction, are obtained. Then, the average island domain size of the island domains is calculated as (I+J+K)/3, where I=(the number average value of lb+the number average value of le)/2 as a shape index of the island domains, J=(the number average value of ld+the number average value of lf/2 as another shape index of the island domains, and K=(the number average value of la+the number average value of lc)/2 as a further other shape index of the island domains. Further, the maximum value among I, J and K is decided as the average major axis L, and the minimum value among I, J and K, as the average minor axis D.

Furthermore, the diameter, major axis and minor axis of an island domain are measured as described below.

A film is cut in the direction parallel to the film surface, to prepare an extra-thin section sample. To clarify the contrast of the island domains, osmic acid, ruthenic acid, phosphorus tungstic acid or the like may be used for staining. The cut surface is observed at an accelerating voltage of 100 kV using a transmission electron microscope (H-7100FA produced by Hitachi), and a photo is taken at a magnification of 20,000×. The obtained photo is inputted as an image into an image analyzer. Arbitrary 100 island domains are selected and image-processed as required, to obtain the island domain sizes as described below. The longest length (lg) of each island domain found on the cut surface in the machine direction of the film and the longest length (lh) of the island domain in the transverse direction are obtained.

(Major Axis and Minor Axis of an Island Domain)

The larger value of lg and lh is decided as the major axis (l), and the smaller value, as the minor axis (d).

(Diameter of an Island Domain)

For each island domain observed, the diameter is calculated as (lg+lh)/2.

(The average of the ratios of the major axes to the minor axes (each ratio=major axis/minor axis) of island domains with a diameter of 30 to 200 nm)

For the island domains with a diameter of 30 to 200 nm, with the ratio of the major axis to the minor axis (major axis/minor axis) of each island domain as l/d, the mean value of the l/d values of 100 island domains is obtained.

It is preferred that the biaxially oriented polyester film of this invention has island domains with a diameter of 30 to 200 nm. This ensures the abovementioned effects, that is, at the time of stretching, it can give such effects that the island domains can be made to function as constraining sites or nodal sites, that in the stress-strain curve, the stress is likely to rise at low rates, and that the molecular chains of the film structure can be easily uniformly stretched and oriented. In other words, the effect of exhibiting the action to uniformly enhance the molecular chain orientation of the sea domain can be further enhanced.

It is preferred in the biaxially oriented polyester film of this invention that the average of the ratios of major axes to the minor axes (each ratio=major axis/minor axis) of the island domains with a diameter of 30 to 200 nm is 1 to 20.

If the average of the ratios of major axes to minor axes (each ratio=major axis/minor axis) is 1 to 20, the island domains can function as constraining sites at the time of stretching, to uniformly and efficiently transmit the stretching stress to the sea domain. If the stretching stress is uniformly and efficiently transmitted to the sea domain, higher orientation in the machine direction and in the transverse direction of the film can be easily achieved. As a result, the dimensional stability and mechanical properties of the biaxially oriented polyester film of this invention can be prominently enhanced, and in the case where the film is used as a base film of a magnetic recording medium, the dimensional changes due to changes in environmental temperature and humidity and due to storage and error rates can be kept very small. Further, the formation of coarse projections can be inhibited, and the ten-point mean roughness Rz on the surface of the film can be easily controlled in a preferred range, while the surface roughness Ra of the film can also be easily controlled in a preferred range. Furthermore, the decline of electromagnetic conversion properties after cartridge storage can be inhibited. In order to further enhance these effects, it is more preferred that the abovementioned average of the ratios of major axes to minor axes (each ratio=major axis/minor axis) is 1 to 15. A further more preferred range is 1 to 10.

It is preferred in the biaxially oriented polyester film of this invention that the island domains with a diameter of 30 to 200 nm are composed of an amorphous resin.

If the island domains with a diameter of 30 to 200 nm are composed of an amorphous resin, the processability with the polyester becomes good, and the surface of the film can be easily made smooth. Further, in the case where the film is used as a base film of a magnetic recording medium, excellent running durability and excellent magnetic conversion properties can be imparted.

In this description, an amorphous resin refers to a resin with such properties that the glass transition temperature only can be detected and that the melting point and the melting peak cannot be detected in the case where the sample is measured using a differential scanning calorimeter (DSC), etc.

It is preferred that the abovementioned glass transition temperature of the amorphous resin is 100 to 400° C. If the glass transition temperature is 100 to 400° C., the island domains in the film can easily function as constraining sites at the time of stretching and at the time of heat treatment, and the molecular chains in the sea domain can be easily more highly oriented in the stretching process. If the molecular chains are more highly oriented, the effects of the present application owing to higher strength and higher dimensional stability can be easily obtained. Further, there is an effect that the defects in the biaxially oriented polyester film of this invention can be decreased. For example in the case where the biaxially oriented polyester film of this invention is produced by a melt film formation method, since the glass transition temperature of the amorphous resin and the processing temperature of the polyester are close to each other when the amorphous resin and the polyester are simultaneously extruded, the amorphous resin remaining unmelted and poorly dispersed decreases to decrease defects in the film.

In the biaxially oriented polyester film of this invention, in view of extruding the polyester and the amorphous resin by a melt film formation method and in view of inhibiting the relaxation of molecular chain orientation in the heat treatment process subsequent to film stretching, it is more preferred that the glass transition temperature of the amorphous resin forming the island domains with a diameter of 30 to 200 nm is 210 to 400° C. A further more preferred range is higher than 210° C. to 400° C., and a still further more preferred range is higher than 210° C. to 350° C. An especially preferred range is higher than 210° C. to 300° C., and the most preferred range is 220 to 250° C. If the glass transition temperature of the amorphous resin forming the island domains with a diameter of 30 to 200 nm is higher than 210° C. to 400° C., the island domains in the film can easily function as constraining sites at the time of stretching and at the time of heat treatment since the glass transition temperature is higher than the stretching temperature and the heat treatment temperature of the film. Further, since the deformation of the island domains is unlikely to occur, the average of the ratios of major axes to minor axes (each ratio=major axis/minor axis) can be easily kept in the range from 1 to 20. Consequently the molecular chain orientation of the sea domain as an effect of this invention can be easily enhanced.

In view of enhancing the miscibility and processability with the polyester constituting the biaxially oriented polyester film of this invention, it is preferred that the abovementioned amorphous resin has a melt viscosity of 100 to 4,000 (Pa·S) at a temperature of 350° C. and at a shear rate of 100 (1/sec). A more preferred range is 100 to 3,000 (Pa·S), and a further more preferred range is 100 to 600 (Pa·S).

In the biaxially oriented polyester film of this invention, it is preferred that the amorphous resin constituting the island domains contains at least one selected from the group consisting of polyetherimides (hereinafter may be referred to as PEIs), polyimides (hereinafter may be referred to as PIs), polyethersulfones (hereinafter may be referred to as PESs), polysulfones (hereinafter may be referred to as PSUs), polyamideimides (hereinafter may be referred to as PAIs), polyarylates (hereinafter may be referred to as PARs), polycarbonates (hereinafter may be referred to as PCs) and polyphenylene ethers (hereinafter may be referred to as PPEs).

If the amorphous resin constituting the island domains contains at least one selected from the group consisting of PEIs, PIs, PESs, PSUs, PAIS, PARs, PCs and PPEs, excellent heat resistance can be imparted to the biaxially oriented polyester film of this invention.

In the biaxially oriented polyester film of this invention, it is preferred that the amorphous resin constituting the island domains is a PEI, PI, PES, PAI or PPE respectively with Tg of 210° C. or higher. Among them, a PEI, PT, PES or PAI respectively with Tg of higher than 210° C. is more preferred, and a PEI, PI or PAI respectively containing imide groups is especially preferred. If imide groups are contained as a component of the amorphous resin, the property of mixing with the polyester can be enhanced and film breaking can be decreased, voids being able to be easily decreased. Further, since the coarse foreign matters in the film are unlikely to be generated, the ten-point mean roughness Rz on the film surface at least on one side can be easily controlled in the preferred range of this invention.

In this description, a PEI is a resin containing ether linkages in the polyimide component comprising imide groups, and is represented by the following general formula.

[Chemical formula 1]

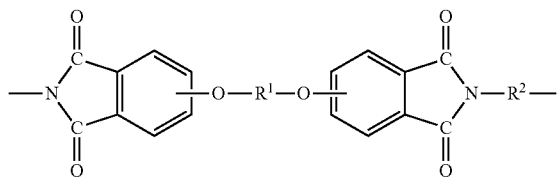

(wherein $R^1$ denotes a divalent aromatic or aliphatic residue with 6 to 30 carbon atoms; and $R^2$ denotes a divalent organic group selected from the group consisting of a divalent aromatic residue with 6 to 30 carbon atoms, an alkylene group with 2 to 20 carbon atoms, a cycloalkylene group with 2 to 20 carbon atoms, and a polydiorganosiloxane group chain-stopped by an alkylene group with 2 to 8 carbon atoms).

Examples of the abovementioned R' and $R^2$ include the aromatic residues represented by the following formulae.

[Chemical formulae 2]

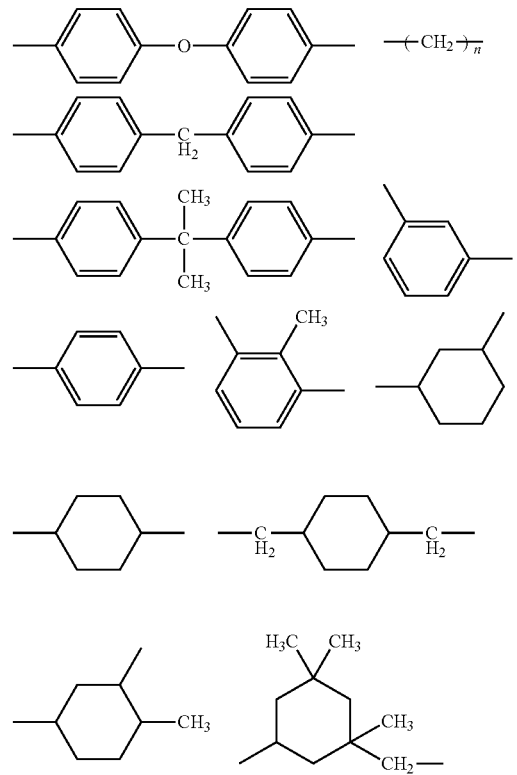

In view of the affinity with the polyester constituting the biaxially oriented polyester film of this invention, cost, melt moldability, etc., preferred as the PEI is a polymer having the recurring units represented by the following formula, which is a condensation product of 2,2-bis[4-(2,3-dicarboxyphenoxy)phenyl]propane dianhydride and m-phenylenediamine or p-phenylenediamine.

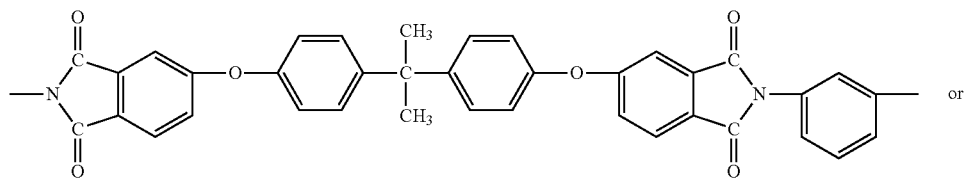

[Chemical formula 3]

or

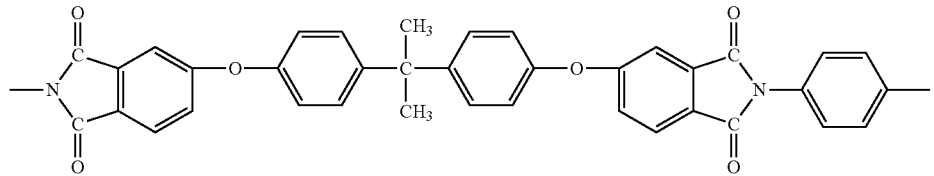

[Chemical formula 4]

The PEI is available under the trade name of "Ultem" (registered trademark) from SABIC Innovative Plastics, and is known under the registered trademark, etc. of "Ultem 1000," "Ultem 1010-1000," "Ultem 1040A-1000," "Ultem 5000," "Ultem 6000," "Ultem CRS5011-1000" and "Ultem XH6050-1000" series and "Extem XH1015" and "Extem UH1016."

Among the abovementioned various PEIs, it is preferred that the amorphous resin of this invention contains at least two PEIs. If two PEIs are contained, the melt processability of PEIs can be enhanced to allow PEIs to be easily mixed into PET. Further, since the entanglement of molecular chains with the polymer forming the sea domain is large, the forces from the constraining sites can be more effectively transmitted to the sea domain in the stretching process, and the molecular chain orientation of the sea domain can be enhanced.

Examples of the preferred combination of two PEIs include a combination consisting of "Ultem 1010-1000" and "Ultem CRS5011-1000" and a combination consisting of "Ultem 1010-1000" and "Ultem XH6050-1000."

In the biaxially oriented polyester film of this invention, it is preferred that the total mass of the island domains with a diameter of 30 to 200 nm is 0.1 to 30 mass % based on the total mass of the film. If the total mass of the island domains is 0.1 to 30 mass % based on the total mass of the film, the mechanical properties, thermal properties, electric properties, surface properties, heat resistance and processability of the biaxially oriented polyester film of this invention can be enhanced. Further, the frequency of film breaking by the stretching for film formation declines, and the biaxially oriented polyester film of this invention can be produced at lower cost and at higher productivity.

In view of lower frequency of film breaking by the stretching for film formation, it is more preferred that the total mass of the island domains with a diameter of 30 to 200 nm is 0.5 to 15 mass %. A further more preferred range is 1 to 10 mass %, and an especially preferred range is 1 to 5 mass %.

It is preferred that the biaxially oriented polyester film of this invention contains island domains with a diameter of 1 nm to smaller than 30 nm. If the island domains with a diameter of 1 nm to smaller than 30 nm are contained, excellent heat resistance can be easily imparted to the biaxially oriented polyester film of this invention.

In the biaxially oriented polyester film of this invention, it is preferred that the island domains with a diameter of 1 nm to smaller than 30 nm contain a polyetherimide (PEI). If a PEI is contained, excellent heat resistance can be imparted to the biaxially oriented polyester film of this invention.

Meanwhile, the method for measuring the island domains with a diameter of 1 nm to smaller than 30 nm is described later.

In the biaxially oriented polyester film of this invention, the coefficient of hygroscopic expansion at least either in the machine direction or in the transverse direction of the film when the humidity is changed from 40% RH to 80% RH at 30° C. is 0 to 6 ppm/% RH.

In order to achieve lower than 0 ppm/% RH as the abovementioned coefficient of hygroscopic expansion, the stretching ratio of the film must be enhanced extremely. As a result, stretching breaking occurs frequently during film formation, to lower productivity, for thereby enhancing the price of the film. Further, the obtained biaxially oriented film is likely to be broken, since it is very small in the elongation at break, to lower handling properties. For example, in the case where the film is used in a magnetic recording medium or the like, processability declines.

On the other hand, if the abovementioned coefficient of hygroscopic expansion is larger than 6 ppm/% RH, the dimensional changes due to changes in environmental temperature and humidity and after storage, error rates and the like become large, for example, in the case where the film is used in a magnetic recording medium.

In the case where the film is used as a base film of a magnetic recording medium, in view of enhancing the dimensional stability under humidity changes at the time of recording onto and reproducing from the obtained magnetic recording medium and enhancing the dimensional stability after storage at high humidity, it is preferred that the upper limit of the abovementioned coefficient of hygroscopic expansion in at least either direction is 5.5 ppm/% RH. More preferred is 5 ppm/% RH. A preferred range is 0 to 5.5 ppm/% RH, and a more preferred range is 0 to 5 ppm/% RH.

In the case where the biaxially oriented polyester film of this invention is used in a magnetic recording medium, the dimensional stability especially in the transverse direction of the film may be important as the case may be. Accordingly it is preferred that the coefficient of hygroscopic expansion in the transverse direction of the biaxially oriented polyester film of this invention is 0 to 6 ppm/% RH. A more preferred range of the coefficient of hygroscopic expansion in the transverse direction is 0 to 5.5 ppm/% RH, and a further more preferred range is 0 to 5 ppm/% RH.

In the biaxially oriented polyester film of this invention, it is preferred that the haze value inside the film is 0 to 50%.

If the haze value inside the film is 0 to 50%, the cleavages caused between the island domains and the sea domain in the film can be inhibited. As a result, since the island domains can function as constraining sites at the time of stretching, the stretching stress can be uniformly and efficiently transmitted to the sea domain, and when the film is stretched, the higher orientation in the machine direction and in the transverse direction of the film can be realized. Accordingly the dimensional stability and mechanical properties of the biaxially oriented polyester film can be enhanced, and in the case where the film is used in a magnetic recording medium, the dimensional changes due to changes in environmental temperature and humidity and after storage and error rates can be easily made small.

It is more preferred that the abovementioned haze value inside the film is 0 to 40%. A further more preferred range is 0 to 20%, and the most preferred range is 0 to 10%.

Further, in the biaxially oriented polyester film of this invention, it is preferred that the void rate inside the film is 0 to 50%.

If the void rate is 0 to 50%, the cleavages caused between the island domains and the sea domain in the biaxially oriented polyester film of this invention can be inhibited. If the cleavages between the island domains and the sea domain are inhibited, as described above, the island domains can function as constraining sites at the time of stretching, to uniformly and efficiently transmit the stretching stress to the sea domain, and the higher orientation in the machine direction and in the transverse direction of the film can be realized when the film is stretched. Consequently the dimensional stability and mechanical properties of the biaxially oriented polyester film can be enhanced, and in the case where the film is used in a magnetic recording medium, the dimensional changes due to changes in environmental temperature and humidity and after storage and error rates can be made small. Further, if the void rate is small and the void volume due to the cleavages between the island domains and the sea domain is small, then the heat resistance and the wet heat resistance of the film can be enhanced, and in the case where the biaxially oriented polyester film of this invention or the magnetic recording medium obtained by using said film is stored for a long period of time, deterioration can be easily inhibited.

It is more preferred that the abovementioned void rate inside the film is 0 to 40%. A further more preferred range is 0 to 25%, and the most preferred range is 0 to 10%.

In the biaxially oriented polyester film of this invention, it is preferred that the mean value of the refractive index in the machine direction and the refractive index in the transverse direction is 1.600 to 1.850.

If the mean value of the refractive index in the machine direction and the refractive index in the transverse direction is 1.600 to 1.850, the mechanical properties of the biaxially oriented polyester film can be enhanced. Accordingly, for example, in the case where the film is used in a magnetic recording medium, the problem of recording track shifting caused by the contraction of the film in the transverse direction caused by the elongation deformation in the machine direction due to the tension in the machine direction within the tape drive can be inhibited, and the generation of edge damage can be easily inhibited.

In the case where the biaxially oriented polyester film of this invention uses PET as a component, in view of the film formability and cost for controlling the refractive indexes, and in view of the effect of inhibiting the recording track shifting and the edge damage generation in the case where the film is used in a magnetic recording medium, it is more preferred that the abovementioned mean value of the refractive indexes is 1.630 to 1.780, and a further more preferred range is 1.650 to 1.750.

Further, in the case where the biaxially oriented polyester film of this invention uses PEN as a component, it is preferred that the abovementioned mean value of the refractive indexes is 1.780 to 1.850.

In the biaxially oriented polyester film of this invention, it is preferred that the roughness Ra of the film surface on at least one side is 0.5 to 20 nm.

If the abovementioned surface roughness Ra is 0.5 to 20 nm, the friction coefficient with the conveyor rolls and the like during film production, processing, etc. can be made small, and the process trouble occurrence frequency can be lowered. As a result, the biaxially oriented polyester film of this invention can be produced at low cost. Further, in the case where the biaxially oriented polyester film of this invention is used in a magnetic recording medium, the friction between the magnetic head and the film can be made small, and the decline of magnetic tape properties can be inhibited. Further, in the case where the film is used in a magnetic recording medium for high density recording, especially the decline of electromagnetic conversion properties can be inhibited.

In view of lessening the friction coefficient with conveyor rolls, etc. and in view of handling properties during processing, it is preferred that the lower limit of the abovementioned roughness Ra of the film surface at least on one side is 1 nm. More preferred is 2 nm. It is preferred that the upper limit is 10 nm. More preferred is 8 nm, and the most preferred is 5 nm. A preferred range of the roughness Ra of the film surface at least on one side of the biaxially oriented polyester film of this invention is 1 to 10 nm, and a more preferred range is 2 to 8 nm.

It is preferred in the biaxially oriented polyester film of this invention that the ten-point mean roughness Rz of the film surface at least on one side is 50 to 300 nm.

Especially in the case where the biaxially oriented polyester film of this invention is used in a magnetic recording medium, in view of keeping the electromagnetic conversion properties good and in view of inhibiting the decline of electromagnetic conversion properties caused by transfer after cartridge storage, it is preferred that the upper limit of Rz is 250 nm. More preferred is 200 nm. A preferred range of the ten-point mean roughness Rz of the film surface at least on one side of the biaxially oriented polyester film of this invention is 75 to 250 nm. A more preferred range is 100 to 200 nm, and the most preferred range is 50 to 100 nm.

In the biaxially oriented polyester film of this invention, it is preferred that the coefficient of thermal expansion at least either in the machine direction or in the transverse direction of the film is −5.0 to 8.0 ppm/° C.

If the coefficient of thermal expansion is −5.0 to 8.0 ppm/° C., for example, in the case where the film is used as a base film of a magnetic recording medium, the dimensional stability under temperature changes at the time of recording onto and reproducing from the magnetic recording medium can be enhanced, and the dimensional stability after storage at high temperature can also be enhanced.

In view of dimensional stability, it is preferred that the upper limit of the abovementioned coefficient of thermal expansion is 7.0 ppm/° C. More preferred is 5.0 ppm/° C. It is preferred that the lower limit is −3.0 ppm/° C., and more preferred is 0 ppm/° C. Further, a preferred range is −3.0 to 7.0 ppm/° C., and a more preferred range is −2.0 to 4.0 ppm/° C.

In the case where the biaxially oriented polyester film of this invention is used as a base film of a magnetic recording medium, the dimensional stability of the film especially in the transverse direction may be important as the case may be. Therefore, it is preferred that the coefficient of thermal expansion of the biaxially oriented polyester film of this invention in the transverse direction is −5.0 to 8.0 ppm/° C. It is more preferred that the c coefficient of thermal expansion for the biaxially oriented polyester film of this invention in the transverse direction is −3.0 to 7.0 ppm/° C. A further more preferred range is −2 to 4.0 ppm/° C.

In the biaxially oriented polyester film of this invention, it is preferred that the sum of the Young's modulus in the machine direction and the Young's modulus in the transverse direction is 11 to 20 GPa. A more preferred range is 12 to 20 GPa. A further more preferred range of the sum of Young's moduli is 13 to 20 GPa, and an especially preferred range is 14 to 18 GPa. If the sum of Young's moduli is smaller than 11 GPa, for example in the case where the film is used in a magnetic recording medium, as described later, the Young's modulus in the machine direction and the Young's modulus in the transverse direction become insufficient. Therefore, contraction in the transverse direction occurs due to elongation deformation, and the problem of recording track shifting occurs, while edge damage is likely to be generated. Further, if the sum of Young's moduli is larger than 20 GPa, it is necessary to enhance the stretching ratio, for causing extreme orientation, and film breaking frequently occurs to lower productivity. Further, since the elongation at break is small, breaking may easily occur.

In order to keep the sum of the Young's modulus in the machine direction and the Young's modulus in the transverse direction within the abovementioned range, it is preferred that the Young's modulus of the biaxially oriented polyester film in the machine direction is 3.5 to 12 GPa. A more preferred range is 4 to 12 GPa, and an especially preferred range is 5 to 12 GPa. If the Young's modulus in the machine direction is smaller than 3.5 GPa, the film elongates in the machine direction owing to the tension in the machine direction within the tape drive, and since the elongation deformation causes contraction in the transverse direction, the problem of recording track shifting is likely to arise. It is more preferred that the lower limit of the Young's modulus in the machine direction is 4 GPa. Further more preferred is 5 GPa, and still further more preferred is 5.5 GPa. Especially preferred is 6 GPa. On the other hand, if the Young's modulus in the machine direction is larger than 12 GPa, it is difficult to control the Young's modulus in the transverse direction in a preferred range, and the Young's modulus in the transverse direction becomes insufficient, accompanying a tendency of causing edge damage. It is more preferred that the upper limit of the Young's modulus in the machine direction is 11 GPa. Further more preferred is 10 GPa. A more preferred range is 5.5 to 11 GPa, and a further more preferred range is 6 to 10 GPa.

Further, in the biaxially oriented polyester film of this invention, it is preferred that the ratio Em/Et of the Young's modulus Em in the machine direction to the Young's modulus Et in the transverse direction is in a range from 0.50 to 0.95. A more preferred range is 0.60 to 0.90, and a further more preferred range is 0.60 to 0.80. Especially if the Young's modulus in the transverse direction is larger than the Young's modulus in the machine direction, the coefficient of thermal expansion and the coefficient of hygroscopic expansion in the transverse direction can be easily controlled in the ranges of this invention.

Further, it is preferred that the Young's modulus in the transverse direction is in a range from 6 to 12 GPa. If the Young's modulus in the transverse direction is smaller than 6 GPa, the edge damage may be caused. It is more preferred the lower limit of the Young's modulus in the transverse direction is 7 GPa. On the other hand, if the Young's modulus in the transverse direction is larger than 12 GPa, it is difficult to control the Young's modulus in the machine direction in a preferred range, and the film is likely to be deformed owing to the tension in the machine direction, while slitting properties may be deteriorated. It is more preferred that the upper limit of the Young's modulus in the transverse direction is 11 GPa. Further more preferred is 10 GPa. A more preferred range is 7 to 11 GPa, and a further more preferred range is 7 to 10 GPa.

The biaxially oriented polyester film of this invention as described above can be produced, for example, as described below.

In order to produce a biaxially oriented polyester film, for example, polyester pellets of a polyester are melted using an extruder, and the melted polyester is discharged from a die and subsequently cooled and solidified to form a sheet. In this case, in order to remove the non-molten material in the polymer, it is preferred to pass the polymer through a fiber stainless steel filter. Further, in order to impart slipperiness, abrasion resistance, scratch resistance and the like to the surface of the polyester film, it is also preferred to add inorganic particles or organic particles, for example, inorganic particles such as clay, mica, titanium oxide, calcium carbonate, kaolin, talc, wet silica, dry silica, colloidal silica, calcium phosphate, barium sulfate, alumina or zirconia, or organic particles with acrylic acid, styrene-based resin, thermosetting resin, silicone, imide-based compound or the like as a component, particles precipitated from a catalyst or the like added at the time of polyester polymerization reaction (so-called internal particles), etc. Furthermore, various additives such as a compatibilizing agent, plasticizer, anti-weathering agent, antioxidant, thermal stabilizer, lubricant, antistatic agent, brightening agent, colorant, electroconductive agent, crystal nucleating agent, ultraviolet light absorber, flame retarder, flame retarding aid, pigment, dye and the like can also be added to such an extent the present invention is not impaired. In succession, the abovementioned sheet is biaxially stretched. It is biaxially stretched in the machine direction and the transverse direction, and heat-treated. In the stretching process, it is preferred to stretch in two or more steps in each direction. That is, a method of performing longitudinal re-stretching and lateral re-stretching is preferred since a film with high strength suitable as a magnetic tape for high density recording can be easily obtained.

The stretching method can be a sequential biaxial stretching method of stretching in the machine direction followed by stretching in the transverse direction, a simultaneous biaxial stretching method of stretching in the machine direction and in the transverse direction simultaneously using a simultaneous biaxial tenter or the like, or further a method in which the sequential biaxial stretching method and the simultaneous biaxial stretching method are combined, etc.

Especially it is preferred to use a simultaneous biaxial stretching method. Compared with a sequential biaxial stretching method, a simultaneous biaxial stretching method is likely to allow stable stretching at a high ratio since the crystals uniformly grow in the machine direction and in the transverse direction in the film forming process. In this invention, it is important that the island domains in the polyester film are made to function as nodal sites, and in order to increase the molecular chain tension of the sea domain using such an action in the stretching process, tensioning the molecular chains uniformly in the machine direction and in the transverse direction by using simultaneous biaxial stretching allows easy stretching at a high ratio effectively rather than tensioning the molecular chains gradually in the respective steps of sequential biaxial stretching. Meanwhile, a simultaneous biaxial stretching in this description means a stretching method including a process in which the stretching in the machine direction and the stretching in the transverse direction take place simultaneously. It is not necessarily required that the stretching in the machine direction and the stretching in the transverse direction take place simultaneously throughout the entire period. Acceptable is a method in which the stretching in the machine direction begins at first, subsequently the stretching also in the transverse direction begins during the stretching in the machine direction (simultaneous stretching), then the stretching in the machine direction ends at first, while the stretching in the transverse direction remains to take place. As the stretching apparatus, for example, a simultaneous biaxial stretching tenter or the like can be preferably used. Above all, using a simultaneous biaxial tenter driven by linear motors is an especially preferred method, since the film can be stretched without being broken.

The heat treatment after completion of the stretching process can be performed by one step, but in order to control the temperature expansion coefficient and the humidity expansion coefficient within the respective ranges of this invention, it is desirable to perform heat treatment effectively without causing relaxation in the molecular chain orientation by excessive heat treatment. Therefore, it is preferred to perform the heat treatment in multiple steps by controlling the heat treatment temperature. The multiple steps mean that heat treatment is performed by changing the heat treatment temperature in two or more steps.

The heat treatment temperatures can be decided in reference to the melting point of the polyester. It is preferred that the heat treatment temperatures are in a range from [the melting point (Tm) of the polyester constituting the film–100] to (Tm–50)° C., and that the heat treatment times are in a range from 0.5 to 10 seconds. Especially the heat treatment temperature of the first step is preferably set at (Tm–75) to (Tm–50)° C., more preferably at (Tm–75) to (Tm–60)° C., and the heat treatment temperature of the second step is set at a temperature lower than that of the first step. The heat treatment temperature of the second step is set preferably at (Tm–100) to (Tm–75)° C., more preferably at (Tm–100) to (Tm–85)° C. Further, it is more preferred that in the first heat treatment step and/or the second heat treatment step, relaxation treatment is performed in the transverse direction at a relaxation rate of 1 to 5%.

Further, the polyester film produced as described above is wound as a roll. Furthermore, in order to enhance dimensional stability and storage stability, it is also preferred that the film wound as a roll is subjected to heat treatment under a certain temperature condition. The certain temperature condition is to install the film as a roll in a hot air oven or zone set at a certain temperature. If the film as a roll is heat-treated, the strain in the internal structure of the film can be easily eliminated, and the dimensional stability such as creep properties can be improved. For example, in the case where the film as wound is stored or in the case where the film is used in a magnetic recording medium such as a magnetic tape and where the tape as wound is stored or is made to run for use, the tension is applied to the tape in the machine direction, to cause creep deformation in the machine direction as the case may be. However, if the dimensional stability such as creep properties is improved, the storage stability is prominently enhanced.

Meanwhile, in this invention, the polyester film or the polyester film roll may be, as required, processed by heat treatment, microwave heating, molding, surface treatment, lamination, coating, printing, embossing, etching, etc.

With regard to the method for producing the biaxially oriented polyester film of this invention, a typical example in which polyethylene terephthalate (PET) is used as a component of the film, while PEI (A) with a glass transition temperature of 215° C. and PEI (B) with a glass transition temperature of 225° C. are used as the components forming the island domains, is explained below. Of course, the present application is not limited to a substrate in which PET is used as a component, and the present application allows the use of other polymers in the substrate. For example, in the case where polyethylene-2,6-naphthalene dicarboxylate (polyethylene-2,6-naphthalate) with a high glass transition temperature and a high melting point or the like is used to constitute the polyester film, it is only required that extrusion and stretching are performed at temperatures higher than those shown below.

At first, PET is prepared. PET can be produced by any of the following processes. (1) A process in which a low molecular weight polyethylene terephthalate or oligomer is obtained by the direct esterification reaction of terephthalic acid and ethylene glycol used as raw materials, and subsequently a polycondensation reaction is performed using antimony trioxide or titanium compound as a catalyst, to obtain the intended polymer. (2) A process in which a low molecular weight product is obtained by the ester interchange reaction of dimethyl terephthalate and ethylene glycol used as raw materials, and subsequently a polycondensation reaction is performed using antimony trioxide or titanium compound as a catalyst, to obtain the intended polymer. In these processes, the esterification reaction takes place even without a catalyst, but the ester interchange reaction is usually made to take place using a compound of manganese, calcium, magnesium, zinc, lithium, titanium or the like as a catalyst, and after the ester interchange reaction is substantially completed, a phosphorus compound may be added as the case may be for the purpose of inactivating the catalyst used for the reaction.

In the case where the polyester as a component of the biaxially oriented polyester film of this invention is made to contain inert particles, a method of dispersing the inert particles into ethylene glycol at a predetermined rate, to form a slurry, and then adding the ethylene glycol slurry at the time of polymerization is preferred. In the case where the inert particles are added, if the water sol or alcohol sol containing the inert particles obtained, for example, when the inert particles are synthesized is added without being dried once, the particles can be dispersed well. Further, a method of directly mixing the water slurry of inert particles with PET pellets, and kneading the inert particles into PET using a vented twin-screw kneading machine is also effective. As the method for adjusting the content of inert particles, a method of preparing the master pellets containing inert particles at a high concentration by the abovementioned method and diluting the master pellets by the PET not substantially containing the inert particles at the time of film formation, for adjusting the content of inert particles is effective.

As the method for mixing PET and PEIs, a two-step melt-kneading method of (1) preliminarily melt-kneading (pelletizing) the mixture consisting of PEI(A) and PEI (B) before melt extrusion and then (2) preliminarily melt-kneading (pelletizing) the mixture consisting of the composition obtained in (1) and PET, to prepare master chips is a preferred example. In this case, a method of using a high shear mixer capable of applying shear stress such as a twin-screw extruder, for preliminary kneading, to prepare master chips is preferred. In the case where a twin-screw extruder is used for mixing, an extruder equipped with two triple thread screws or two double thread screws is preferred in view of decreasing poorly dispersed matter. PEI (B) with a high glass transition temperature cannot be easily mixed with PET, but if PEI (A) intervenes, PEI (B) can be easily mixed with PET if the two-step melt-kneading method is used.

In this invention, in the first step of kneading, PEI (A) and PEI (B) are mixed. It is preferred to prepare master chips containing PEI (B) mixed at a high concentration in a melting temperature range from 300 to 400° C., more preferably 340 to 400° C. It is especially preferred to keep the mixing ratio by mass of PEI (A)/PEI (B) in a range from 90/10 to 10/90. A more preferred range is 80/20 to 20/80, and a further more preferred range is 80/20 to 50/50. The composition obtained by the first step of kneading is mixed with PET by the second step of kneading. The blend chips obtained by the first step of kneading are dried at 150° C. under reduced pressure for 3 hours, and subjected to the second step of kneading. If the mixing ratio by mass of PEI (A)/PEI (B) is controlled in a range from 80/20 to 50/50 in the first step of kneading, it can be prevented that the PET and PEIs cause phase separation resulting in poor mixing in the second step of kneading. It is preferred to use highly viscous PET with an IV of 0.8 or higher as the PET used in the second step of kneading. A more preferred viscosity is 1.0 or higher. Further, it is preferred that the mixing ratio by mass of PET/(the blend composition of PEI (A) and PEI (B)) is 70/30 to 30/70. A more preferred range is 70/30 to 40/60. This method is important for such reasons that the highly viscous PET can enhance the shear stress, for enhancing the mixing force, that the mixed amount of PEI (B) is adjusted to enhance the dispersibility of PEI (B) into PET, that the coarse foreign matter in the film can be decreased to inhibit the decline of stretching properties, and that the surface roughness can be prevented from being extremely large.

Further on the other hand, a mixture consisting of PET and PEI (A) with a low glass transition temperature can also be preliminarily melt-kneaded (pelletized), to prepare master chips as a raw composition, for allowing the PEI (A) content in the film to be adjusted as appropriate. Furthermore in the case where PET and PEI (A) are mixed, it is preferred to prepare master chips with PEI (A) mixed at a high concentration, since there is a difference in melt viscosity. It is especially preferred that the mixing ratio by mass of PET/PEI (A) is 10/90 to 70/30. A more preferred range is 30/70 to 60/40.

When PET and PEI (A) are kneaded, the processing temperature is important in view of dispersing the PEI well into PET. A temperature region in which PET is not thermally decomposed while PEI (A) shows sufficient flowability to allow processing is important. Specifically, for example, a range from 280° C. to 320° C. is preferred. In the case where the master pellets consisting of PET and PEI (A) are used to prepare the biaxially oriented polyester film of this invention, it is more preferred that the processing temperature of PET and PEI (A) is 290 to 315° C. in view of imparting excellent mechanical properties and dimensional stability to the obtained film.

In the case where a film is formed, an ordinary single-screw extruder can be charged with the already mixed raw master chips, for melt film formation, or direct sheeting in a state where high shear is applied can also be performed without preparing the master chips.

Further, in the case where a twin-screw extruder is used for pelletization, it is preferred that the rotational speed of the screws is 100 to 500 rpm. A more preferred range is 200 to 400 rpm. Also when the rotational speed of the screws is set in a preferred range, high shear stress can be easily applied, and poorly dispersed matter can be easily decreased. Furthermore, it is preferred that the ratio of (screw shaft length/screw shaft diameter) of the twin-screw extruder is in a range from 20 to 60, and a more preferred range is 30 to 50.

Moreover, in the case of twin-screw kneading, it is preferred to establish kneading zones with kneading paddles or the like in order to enhance the kneading force. It is desirable to arrange preferably two or more kneading zones, more preferably three or more kneading zones, especially preferably four or more kneading zones in such a manner as to form a screw shape. In this case, the mixing order of the raw materials is not especially limited. A method of mixing all the raw materials and subsequently melt-kneading by the abovementioned method, a method of mixing some raw materials, then melt-kneading by the abovementioned method, further mixing the remaining raw materials and finally melt-kneading, a method of mixing some raw materials and subsequently mixing the remaining raw materials using a side feeder during melt kneading by a single-screw or twin-screw extruder, or any other method can be used. The method of using a supercritical fluid described in "Polymer Processing," vol. 15, no. 6, pages 382 to 385 (2003), Journal of the Japan Society of Polymer Processing is also a preferred example.

In the case where four or more kneading zones are established, it is preferred to knead at a screw rotational speed of 300 to 700 rpm, since the kneading time is likely to be long. It is more preferred to knead at 400 to 600 rpm, since the effects of this invention can be obtained with less thermal deterioration of the polymer at higher dispersibility.

Then, the obtained abovementioned pellets are dried at 180° C. under reduced pressure for 3 hours or more and supplied into an extruder heated to a range of 270 to 320° C. in a nitrogen stream or under reduced pressure to ensure that the intrinsic viscosity does not decline, and the polymer is extruded from a slit die and cooled on a casting roll, to obtain a cast film. In this case, it is preferred to use any of various filters for removing foreign matter and a modified polymer, for example, a filter made from such a material as a sintered metal, porous ceramic, sand or wire screen. Further, as required, a gear pump may also be installed to enhance the capability of supplying a constant amount. In the case where a layered film is produced, two or more extruders and a manifold or joining block are used to melt-laminate multiple different polymers.

Then, the obtained cast film is biaxially stretched to be biaxially oriented. The stretching method can be either a sequential biaxial stretching method or a simultaneous biaxial stretching method.

For example in the case where a sequential biaxial stretching method is used, at first stretching in the machine direction is performed and subsequently the stretching in the transverse direction is performed. The stretching in the machine direction is usually performed using rolls. The stretching temperature can be decided as appropriate depending on the polymer used, but can be decided in reference to the glass transition temperature Tg of the polyester of the cast film. Further, in the case where the glass transition temperature (Tg) is unclear or in the case where there are multiple glass transition temperatures, the Tg of the polyester, the content of which is the largest among all the polyesters constituting the film, should be employed as the Tg of the cast film.

It is preferred that the temperature in the stretching process in the machine direction is in a range from (Tg−10° C.) to (Tg+25° C.). A more preferred range is (Tg) to (Tg+10° C.). The stretching is performed in one step or two or more multiple steps. If the stretching temperature is lower than the abovementioned range, film breaking occurs frequently to lower productivity, or to lower re-stretching properties, or to make stable stretching at a high ratio difficult. If the stretching temperature is higher than the abovementioned range, molecular orientation does not take place sufficiently, and the Young's modulus of the produced film may decline.

The stretching ratio is 2 to 8 times, since the film of this invention can be easily obtained. A preferred range is 2.5 to 7 times, and a more preferred range is 3 to 4 times. The most preferred range is 3 to 3.5 times. In the film structure of this invention, since the island domains exist as nodal sites, the stress is likely to rise at low rates in the stress-strain curve. Therefore, if the stretching ratio in the machine direction is too high, the tension of molecular chains and crystallization may progress excessively, not allowing the subsequent stretching. Accordingly it is preferred that the stretching ratio in the machine direction is set in the abovementioned range.

It is preferred that the stretching in the transverse direction is performed using a tenter with two or more temperature gradients established. The temperature in the first step is in a range from "the stretching temperature in the machine direction) to (the stretching temperature in the machine direction+30° C.). A preferred range is (the stretching temperature in the machine direction+5° C.) to (the stretching temperature in the machine direction+20° C.). Then, the film is further stretched in the second step preferably at (the stretching temperature of the first step in the transverse direction+60° C.) to (the stretching temperature of the first step in the transverse direction+100° C.). A more preferred range is (the stretching temperature of the first step in the transverse direction+80° C.) to (the stretching temperature of the first step in the transverse direction+100° C.).

If the stretching temperature does not comply with the abovementioned range, film breaking occurs frequently to lower productivity and the orientation cannot be sufficiently enhanced to lower strength as the case may be, owing to insufficient heat quantity or excessive progression of crystallization.

Above all in the biaxially oriented polyester film of this invention, since the island domains function as nodal sites, it is preferred to raise the temperature stepwise for stretching. It is especially preferred that the temperature of the second step in the transverse direction is set at (the stretching temperature of the first step in the transverse direction+60° C.) to (the stretching temperature of the first step in the transverse direction+100° C.), since this condition is effective for obtaining the effect of high dimensional stability of this invention. A more preferred range is (the stretching temperature of the first step in the transverse direction+80° C.) to (the stretching temperature of the first step in the transverse direction+100° C.).

Between the stretching of the first step in the transverse direction and the stretching of the second step in the transverse direction, stretching in the machine direction using a roll stretching machine or the like can also be performed. It is preferred that the temperature in this case is (the stretching temperature of the first step in the transverse direction+30° C.) to (the stretching temperature of the first step in the transverse direction+60° C.).

Subsequently this stretched film is heat-treated. It is preferred that the heat treatment in this case is performed at a temperature of 180 to 250° C., especially preferably 190 to 220° C. for 1 to 20 seconds. In succession, the film is intermediately cooled to a range from 100 to 180° C. and then cooled to room temperature, while being subjected to relaxation treatment in the machine and transverse directions as required, and is wound to obtain the intended biaxially oriented polyester film. In this case, in the case where the strength in the machine or transverse direction is desired to be enhanced, it is preferred to stretch again in the machine or transverse direction before performing the aforementioned heat treatment. The preferred stretching conditions in this case are a stretching temperature of 110 to 150° C. and a stretching ratio of 1.1 to 1.8.

In the abovementioned production example, a sequential biaxial stretching machine is used, but a simultaneous biaxial stretching apparatus can also be used for production. In the latter case, a stretching apparatus having linear motors for driving clips is preferred.

For example, the film is introduced into a simultaneous biaxial stretching tenter and biaxially stretched in the machine and transverse directions simultaneously. It is preferred that the stretching speed is in a range from 100 to 20,000%/min in both the machine and transverse directions. A more preferred range is 500 to 10,000%/min, and a further more preferred range is 2,000 to 7,000%/min. If the stretching speed is lower than 100%/min, the film is exposed to heat for a longer period of time, to especially crystallize the edge portions, causing film breaking or lowering film formability or not allowing molecular orientation to progress sufficiently. Thus, the produced film may decline in mechanical properties such as Young's modulus. Further, if the stretching speed is higher than 20,000%/min, intermolecular entanglement is likely to be generated at the time of stretching, to lower stretching properties, making stretching at a high ratio difficult as the case may be.

The stretching temperature can be decided as appropriate in response to the polymer used, and can be decided, for example, in reference to the glass transition temperature Tg of the polyester of the cast film. It is preferred that the temperatures in the stretching of the first step in the machine and transverse directions are in a range from Tg to Tg+30° C. A more preferred range is Tg+5° C. to Tg+20° C. If the stretching temperatures are lower than the abovementioned range, film breaking occurs frequently to lower productivity or to lower re-stretching properties, making stable stretching at a high ratio difficult as the case may be. If the stretching temperatures are higher than the abovementioned range, especially the edge portions are crystallized to cause stretching breaking, thus lowering film formability, not allowing molecular orientation to progress sufficiently. Thus, the produced film may decline in Young's modulus.

Further, in the case where the polyester film production process includes multi-step stretching, i.e., re-stretching, the stretching temperatures of the first step are as described above. It is preferred that the stretching temperatures of the second step are Tg+40° C. to Tg+120° C. A more preferred range is Tg+60° C. to Tg+100° C. The most preferred range is Tg+80° C. to Tg+100° C. If the stretching temperatures do not comply with the abovementioned range, insufficient heat quantity and excessive progression of crystallization cause film breaking frequently to lower productivity, or do not allow the orientation to be enhanced sufficiently to lower the strength as the case may be.

Furthermore, the stretching ratio can be decided as appropriate, in response to the polymer used, stretching temperature and stretching method (multi-step stretching, etc.). For example, it is preferred that the total area stretching ratio (total longitudinal stretching ratio×total lateral stretching ratio) is in a range from 20 to 40 times. A more preferred range is 25 to 35 times. It is preferred that the total stretching ratio either in the machine direction or in the transverse direction is 2.5 to 8 times. A more preferred range is 3 to 7 times. If the stretching ratio is smaller than the abovementioned range, stretching irregularity or the like occurs and the processability of the film may decline. Further, if the stretching ratio is larger than the abovementioned range, stretching breaking occurs frequently to lower productivity as the case may be.

In the case where stretching is performed in multiple steps in each direction, it is preferred that the stretching ratio of the first step in the machine or transverse direction is 2 to 4 times. A more preferred range is 3 to 3.8 times. Further, a preferred area stretching ratio of the first step is 4 to 18 times, and a more preferred range is 7 to 15 times. These stretching ratio values are especially suitable when a simultaneous biaxial stretching method is employed, but can also be applied to a sequential biaxial stretching method. In the film structure of this invention, the island domains exist as nodal sites, and therefore the stress is likely to rise at low rates in the stress-strain curve. Consequently if the stretching ratio of the first step is too high, the tension of molecular chains and crystallization progresses excessively, not allowing the stretching of the second step to be performed. Therefore, it is preferred that the stretching ratio of the first step is set in the abovementioned range.

Moreover, in the case where re-stretching is performed, it is preferred that the stretching ratio in one direction is 1.05 to 2.5 times. A more preferred range is 1.2 to 1.8 times. It is preferred that the area stretching ratio of re-stretching is 1.4 to 4 times. A more preferred range is 1.9 to 3 times.

In succession, the stretched film is heat-treated under tension or while being relaxed in the transverse direction. As for the heat treatment conditions, it is preferred that the heat treatment temperature is 155° C. to 205° C. and that the heat treatment time is in a range from 0.5 to 10 seconds. It is preferred that the heat treatment is performed in two or more multiple steps. Especially the heat treatment temperature of the first step is set preferably at 180 to 205° C., more preferably 180 to 195° C., and the heat treatment temperature of the second step is set at a temperature lower than that of the first step, preferably at 155 to 180° C., more preferably 155 to 170° C. Further, it is preferred to perform relaxation treatment at a relaxation rate of 1 to 5% in the transverse direction in the heat treatment of the second step only. If the abovementioned heat treatment of multiple steps is performed, the relaxation of molecular chains progresses effectively while the mechanical properties such as Young's modulus and the dimensional stability under changes of temperature and humidity are enhanced, and consequently the storage stability in terms of the dimensional changes of the film stored in a loaded state can be easily enhanced.

Subsequently, the film edges are removed, and the film is wound around a core. Further, in order to further enhance the effects of dimensional stability and storage stability, it is also preferred to heat-treat the film as wound around a core (rolled film) in a hot air oven, etc. The atmosphere temperature of the heat treatment can be decided in reference to the glass transition temperature (Tg) of the film preferably in a range from (Tg−80) to (Tg−30)° C. A more preferred range is (Tg−75) to (Tg−35)° C., and a further more preferred range is (Tg−70) to (Tg−40)° C. The treatment time is preferably in a range from 10 to 360 hours. A more preferred range is 24 to 240 hours, and a further more preferred range is 72 to 168 hours. It is preferred that the total time of the heat treatment of a rolled film performed in multiple steps is in the abovementioned range.

The method for producing a magnetic recording medium is explained below.

The substrate (biaxially oriented polyester film) for a magnetic recording medium obtained as described above is slit, for example, with a width of 0.1 to 3 m, and each strip is conveyed at a speed of 20 to 300 m/min and at a tension of 50 to 300 N/m, while being coated with a magnetic coating material and a non-magnetic coating material in layers on one surface (A). Meanwhile, the magnetic coating material is coated as an upper layer with a thickness of 0.1 to 0.3 µm, and the non-magnetic coating material is coated as a lower layer with a thickness of 0.5 to 1.5 µm. Then, the support coated with the magnetic coating material and the non-magnetic coating material is magnetically oriented and dried at a temperature of 80 to 130° C. Subsequently, the strip is coated with a back coating material to a thickness of 0.3 to 0.8 µm on the other surface (B), and is subjected to calender treatment and wound. Meanwhile the calender treatment is performed using a small test calender machine (steel/nylon rolls, five rolls) at a temperature of 70 to 120° C. and at a linear pressure of 0.5 to 5 kN/cm. Then, it is subjected to aging treatment at 60 to 80° C. for 24 to 72 hours and slit with a width of ½ inch (1.27 cm), to prepare a pancake. Then, from the pancake, a specific length is installed into a cassette, to prepare a cassette tape as a magnetic recording medium.

The compositions of the magnetic coating material, etc. can be, for example, as shown below.

| (Composition of the magnetic coating material) | |
|---|---|
| Ferromagnetic metal powder | 100 parts by mass |
| Modified vinyl chloride copolymer | 10 parts by mass |
| Modified polyurethane | 10 parts by mass |
| Polyisocyanate | 5 parts by mass |
| 2-ethylhexyl oleate | 1.5 parts by mass |
| Palmitic acid | 1 part by mass |
| Carbon black | 1 part by mass |
| Alumina | 10 parts by mass |
| Methyl ethyl ketone | 75 parts by mass |
| Cyclohexanone | 75 parts by mass |
| Toluene | 75 parts by mass |

| (Composition of the back coating material) | |
|---|---|
| Carbon black (average particle size 20 nm) | 95 parts by mass |
| Carbon black (average particle size 280 nm) | 10 parts by mass |
| Alumina | 0.1 parts by mass |
| Modified polyurethane | 20 parts by mass |
| Modified vinyl chloride copolymer | 30 parts by mass |
| Cyclohexanone | 200 parts by mass |
| Methyl ethyl ketone | 300 parts by mass |
| Toluene | 100 parts by mass |

The magnetic recording medium can be, for example, suitably used for computer data backup (for example, a recording medium as a linear tape (LTO4 or LTO5, etc.)) or for recording digital images.

(Methods for Measuring Physical Properties and Methods for Evaluating Effects)

The methods for measuring physical property values and the methods for evaluating effects in this invention are as described below.

(1) Average Island Domain Size of Island Domains

A film was cut (A) in the direction parallel to the machine direction and perpendicular to the film surface, (B) in the direction parallel to the transverse direction and perpendicular to the film surface, and (C) in the direction parallel to the film surface, to prepare extra-thin section samples. In order to clarify the contrast of the island domains, osmic acid, ruthenic acid, phosphorus tungstic acid or the like may also be used for staining. A cut surface was observed at an accelerating voltage of 100 kV using a transmission electron microscope (H-7100FA produced by Hitachi), and a photo was taken at a magnification of 20,000×. The obtained photo was inputted as an image into an image analyzer. Arbitrary 100 island domains were selected and image-processed as required, to obtain the island domain sizes as described below. The longest lengths (la) of the respective island domains found in the cut surface of (A) in the film thickness direction and the longest lengths (lb) of the respective island domains in the machine direction, the longest lengths (lc) of the respective island domains found in the cut surface of (B) in the film thickness direction and the longest lengths (ld) of the respective island domains in the transverse direction, and the longest lengths (le) of the respective island domains found in the cut surface of (C) in the machine direction of the film and the longest lengths (lf) of the respective island domains in the transverse direction, were obtained. Then, the average island domain size of the island domains was calculated as (I+J+K)/3, where I=(the number average value of lb+the number average value of le)/2 as a shape index of the island domains, J=(the number average value of ld+the number average value of lf)/2 as another shape index of the island domains, and K=(the number average value of la+the number average value of lc)/2 as a further other shape index of the island domains. Further, the maximum value among I, J and K was decided as the average major axis L, and the minimum value among I, J and K, as the average minor axis D.

Meanwhile, the method employed in the case where image analysis was performed is described below.

The transmission electron microscope photo of each sample was inputted into the computer by a scanner. Then, a special software (Image Pro Plus Ver. 4.0 produced by Planetron) was used to perform image analysis. The Tone Curve was operated to adjust the brightness and the contrast. Subsequently 100 sites were observed at random within the circle equivalent diameter of the high contrast component of the image obtained by using a Gaussian filter, and the average island domain size was calculated by the abovementioned calculation method. In the case where a negative photo was used as the transmission electron microscope photo, Leafscan 45 Plug-In produced by Nippon Scitex was used as the abovementioned scanner, and in the case where a positive photo was used as the transmission electron microscope photo, GT-7600S produced by Seiko Epson Corporation was used as the abovementioned scanner. In both the cases, equivalent values can be obtained.

Image processing procedure and parameters:
Flattening, once
Contrast +30
Gaussian, once
Contrast +30, luminance −10
Gaussian, once
Flattening filter: Background (black), object width (20 pix)
Gaussian filter: Size (7), strength (10)

(2) The Diameter and the Ratio of the Major Axis to the Minor Axis (Major Axis/Minor Axis) of an Island Domain A film was cut in the direction parallel to the film surface, to prepare an extra-thin section sample. To clarify the contrast of the island domains, osmic acid, ruthenic acid, phosphorus tungstic acid or the like may be used for staining. The cut surface was observed at an accelerating voltage of 100 kV using a transmission electron microscope (H-7100FA produced by Hitachi), and a photo was taken at a magnification of 20,000×. The obtained photo was inputted as an image into an image analyzer. Arbitrary 100 island domains were selected and image-processed as described above as required, to obtain the island domain sizes as described below. The longest length (lg) of each island domain found on the cut surface in the machine direction of the film and the longest length (lh) of the island domain in the transverse direction were obtained.

(Major Axis and Minor Axis of an Island Domain)

The larger value of lg and lh was decided as the major axis (l), and the smaller value, as the minor axis (d).

(Diameter of an Island Domain)

For each island domain observed, the diameter was calculated from (lg+lh)/2.

(The average of the ratios of the major axes to the minor axes (each ratio=major axis/minor axis) of island domains with a diameter of 30 to 200 nm)

For the island domains with a diameter of 30 to 200 nm, with the ratio of the major axis to the minor axis (major axis/minor axis) of each island domain as l/d, the mean value of the l/d values of 100 island domains was obtained.

(3) Coefficient of Thermal Expansion

Measurement was made under the following conditions in the transverse direction of the film, and the mean value of three measurement results was employed as the coefficient of thermal expansion in this invention.

Measuring instrument: Thermomechanical analyzer TMA-50 produced by Shimadzu Corporation Sample size: 10 mm in the machine direction of the film× 12.6 mm in the transverse direction of the film Load: 0.5 g Number of measuring times: 3

Measuring temperatures: In the state where nitrogen was kept flowing, the temperature was raised from 25° C. to 50° C. at a heating rate of 2° C./min, kept at the temperature for 5 minutes, and lowered to 25° C. at a cooling rate of 2° C./min, and the dimensional change $\Delta L$ (mm) in the transverse direction of the film in a temperature range from 40 to 30° C. was measured. The coefficient of thermal expansion (ppm/° C.) was calculated from the following formula.

$$\text{Coefficient of thermal expansion(ppm/° C.)} = 10^6 \times \{(\Delta L/12.6)/(40-30)\}$$

The temperature expansion coefficient in the machine direction was also measured as described above except that the direction of the sample was changed.

(4) Coefficient of Hygroscopic Expansion

Measurement was made under the following conditions in the transverse direction of the film, and the mean value of three measurement results was employed as the coefficient of hygroscopic expansion in this invention.

Measuring instrument: Thermomechanical analyzer TMA-50 produced by Shimadzu Corporation (humidity generator: humidity atmosphere control device HC-1 produced by ULVAC-RIKO, Inc.)

Sample size: 10 mm in the machine direction of the film× 12.6 mm in the transverse direction of the film Load: 0.5 g Number of measuring times: 3

Measuring temperature: 30° C.

Measuring humidities: The humidity was kept at 40% RH for 6 hours, and the dimension was measured. The humidity was raised up to 80% RH, taking 40 minutes and kept at 80% RH for 6 hours, and the dimensional change $\Delta L$ (mm) in the transverse direction of the film was measured. The coefficient of hygroscopic expansion (ppm/% RH) was calculated from the following formula.

$$\text{Coefficient of hygroscopic expansion(ppm/\% RH)} = 10^6 \times \{(\Delta L/12.6)/(80-40)\}$$

The coefficient of hygroscopic expansion in the machine direction was also measured as described above, except that the direction of the sample was changed.

(5) Three-Dimensional Surface Roughness Ra and Ten-Point Mean Roughness Rz

Three-dimensional fine shape measuring instrument (ET-350K) and three-dimensional surface roughness analysis system (TDA-22) respectively produced by Kosaka Laboratory Ltd. were used to measure the three-dimensional surface roughness Ra (arithmetical mean roughness) and the surface roughness Rz (ten-point mean roughness). The measuring conditions were as follows. The mean value of 20 measurement results was employed. Further, measurement was made 20 times each on both the surfaces. With each of Ra and Rz, the value of the surface with smaller values was employed.

Stylus diameter: 2 μm
Load of stylus: 0.04 mN
Longitudinal magnification: 50,000×
Cutoff: 0.25 mm
Feed pitch: 5 μm
Measurement length: 0.5 mm
Measurement area: 0.2 mm$^2$
Measuring speed: 0.1 mm/sec (6) Glass Transition Temperature (Tg)

The following instrument was used to measure specific heat under the following conditions, and the glass transition temperature was decided according to JIS K 7121 (1987).

Instrument: Temperature-modulated DSC produced by TA Instrument

Measuring conditions:
Heating temperature: 270 to 570 K (RCS cooling method)
Temperature calibration: Melting points of highly pure indium and tin
Temperature modulation amplitude: ±1 K
Temperature modulation period: 60 seconds
Heating step: 5 K
Sample weight: 5 mg
Sample container: Open container made of aluminum (22 mg)
Reference container: Open container made of aluminum (18 mg)

Meanwhile, the glass transition temperature was calculated from the following formula.

Glass transition temperature=(Extrapolated glass transition initiation temperature+Extrapolated glass transition end temperature)/2

(7) Melting Point (Tm)

As a differential scanning colorimeter, DSC (RDC220) produced by Seiko Instruments Inc. was used, and as a data analyzer, Disc Station (SSC/5200) produced by Seiko Instruments Inc. was used. Approximately 5 mg of a sample was melted and kept at 300° C. on an aluminum pan for 5 minutes and quickly cooled to be solidified, then being heated from room temperature at a heating rate of 20° C./min. The peak temperature of the melt endothermic peak observed at this time was employed as the melting point (Tm).

(8) Width Dimension Measurement

A film slit to have a width of 1 m was conveyed at a tension of 200 N, and one surface (A) of the substrate was coated with a magnetic coating material and a non-magnetic coating material respectively with the following compositions in layers using an extrusion coater (the magnetic coating material was used to form an upper layer with a coating thickness of 0.2 μm, and the non-magnetic coating material was used to form a lower layer with a coating thickness of 0.9 μm), and was magnetically oriented, being dried at a drying temperature of 100° C. Then, the surface (B) of the other side was coated with a back coating material with the following composition, and the film was subjected to calender treatment by a small test calender machine (steel/nylon rolls, five rolls) at a temperature of 85° C. and at a linear pressure of $2.0 \times 10^5$ N/m, then being wound. The abovementioned tape roll was slit with a width of ½ inch (12.65 mm), to prepare a pancake. Then, a length of 200 m from the pancake was installed into a cassette, to obtain a cassette tape.

| (Composition of the magnetic coating material) | |
|---|---|
| Ferromagnetic metal powder | 100 parts by mass |
| [Fe:Co:Ni:Al:Y:Ca = 70:24:1:2:2:1 (ratio by mass)] | |
| [Major axis length . . . 0.09 μm, axis ratio . . . 6, coercive force . . . 153 kA/m (1,922 Oe), saturation magnetization . . . 146 m$^2$/kg (146 emu/g), BET specific surface area . . . 53 m$^2$/g, X-ray particle size . . . 15 nm] | |
| Modified vinyl chloride copolymer (binder) | 10 parts by mass |
| (Average polymerization degree . . . 280, epoxy group content . . . 3.1 mass %, sulfonic acid group content . . . $8 \times 10^{-5}$ equivalent/g) | |
| Modified polyurethane (binder) | 10 parts by mass |
| (Number average molecular weight . . . 25,000, sulfonic acid group content . . . $1.2 \times 10^{-4}$ equivalent/g, glass transition point . . . 45° C.) | |
| Polyisocyanate (curing agent) | 5 parts by mass |
| (Coronate L (trade name) produced by Nippon Polyurethane Industry Co., Ltd.) | |
| 2-ethylhexyl oleate (lubricant) | 1.5 parts by mass |
| Palmitic acid (lubricant) | 1 part by mass |
| Carbon black (antistatic agent) | 1 part by mass |
| (Average primary particle size: 0.018 μm) | |
| Alumina (abrasive) | 10 parts by mass |
| (α alumina, average particle size . . . 0.18 μm) | |
| Methyl ethyl ketone | 75 parts by mass |
| Cyclohexanone | 75 parts by mass |
| Toluene | 75 parts by mass |

| (Composition of the non-magnetic coating material) | |
|---|---|
| Modified polyurethane | 10 parts by mass |
| (Number average molecular weight . . . 25,000, sulfonic acid group content . . . $1.2 \times 10^{-4}$ equivalent/g, glass transition point . . . 45° C.) | |
| Modified vinyl chloride copolymer | 10 parts by mass |
| (Average polymerization degree . . . 280, epoxy group content . . . 3.1 mass %, sulfonic acid group content . . . $8 \times 10^{-5}$ equivalent/g) | |
| Methyl ethyl ketone | 75 parts by mass |
| Cyclohexanone | 75 parts by mass |
| Toluene | 75 parts by mass |
| Polyisocyanate | 5 parts by mass |

| (Coronate L (trade name) produced by Nippon Polyurethane Industry Co., Ltd.) | |
|---|---|
| 2-ethylhexyl oleate (lubricant) | 1.5 parts by mass |
| Palmitic acid (lubricant) | 1 part by mass |
| (Composition of the back coating material) | |
| Carbon black | 95 parts by mass |
| (Antistatic agent, average primary particle size . . . 0.018 μm) | |
| Carbon black | 10 parts by mass |
| (Antistatic agent, average primary particle size . . . 0.3 μm) | |

-continued

| (Coronate L (trade name) produced by Nippon Polyurethane Industry Co., Ltd.) | |
|---|---|
| alumina (α alumina, average particle size . . . 0.18 μm) | 0.1 part by mass |
| Modified polyurethane (Number average molecular weight . . . 25,000, sulfonic acid group content . . . 1.2 × 10⁻⁴ equivalent/g, glass transition point . . . 45° C.) | 20 parts by mass |
| Modified vinyl chloride copolymer (Average polymerization degree . . . 280, epoxy group content . . . 3.1 mass %, sulfonic acid group content . . . 8 × 10⁻⁵ equivalent/g) | 30 parts by mass |
| Cyclohexanone | 200 parts by mass |
| Methyl ethyl ketone | 300 parts by mass |
| Toluene | 100 parts by mass |

A tape was taken out from the cartridge of a cassette tape, and installed in a sheet width measuring instrument prepared as shown in FIG. 1 and placed in the following thermo-hygrostat. Meanwhile, the sheet width measuring instrument shown in FIG. 1 was an instrument for measuring the dimension of a sheet in the transverse direction using a laser. A magnetic tape (9) was set along free rolls (5) to (8) and fixed at one end thereof to a load detector (3). The tape was loaded at the other end thereof with a weight (4) in such a manner the weight might be suspended from the tape. If the magnetic tape (9) is irradiated with laser light (10), the laser light (10) linearly oscillated from a laser oscillator (1) in the transverse direction is intercepted at the portion of the magnetic tape (9) only, and enters a light receiving unit (2). The intercepted laser width is measured as the width of the magnetic tape. The mean value of three measurement results is employed as the width in this invention.

Measuring instrument: Sheet width measuring instrument produced by Yamaha Engineering Laser oscillator (1) and light receiving unit (2): Laser dimension measuring machine LS-5040 produced by Keyence Load detector (3): Load cell CBE1-10K produced by NMB Thermo-hygrostat: SE-25VL-A produced by Kato Inc.

Load (4): Weight (in the machine direction)

Sample size: ½ inch wide×250 mm long

Holding time: 5 hours

Number of measuring times: 3

(Width Dimension Change Rate: Dimensional Stability)

Under two different conditions, width dimensions (IA and IB) were measured, and the dimensional change rate was calculated from the following formula. Specifically the dimensional stability was evaluated according to the following criterion.

After lapse of 24 hours under condition A, IA was measured, and subsequently after lapse of 24 hours under condition B, IB was measured. A sample cut out at a point of 30 m from the beginning of a tape cartridge, a sample cut out at a point of 100 m, and a tape cut out at a point of 170 m, three samples in total, were measured. A tape marked by a cross was evaluated "unacceptable."

Condition A: 10° C., 10% RH, tension 0.85 N
Condition B: 29° C., 80% RH, tension 0.55 N
Width dimension change rate (ppm)=$10^6 \times ((IB-IA)/IA)$
Double circle: The maximum value of width dimension change rate is less than 500 (ppm).
Single circle: The maximum value of width dimension change rate is 500 (ppm) to less than 600 (ppm).
Triangle: The maximum value of width dimension change rate is 600 (ppm) to less than 700 (ppm).
Cross: The maximum value of width dimension change rate is 700 (ppm) or more.

(9) Storage Stability

A tape was taken out from the cartridge of the cassette tape prepared as described in the abovementioned section (8), and under the following two different conditions, width dimensions (IC and ID) were measured. The dimensional change rate was calculated from the following formula. Specifically the storage stability was evaluated according to the following criterion.

After lapse of 24 hours at 23° C. and 65% RH, IC was measured, and the cartridge was stored in an environment of 40° C. and 20% RH for 10 days. Subsequently after lapse of 24 hours at 23° C. and 65% RH, ID was measured. A sample cut out at a point of 30 m from the beginning of the tape cartridge, a sample cut out from a point of 100 m, and a sample cut out from a point of 170 m, three samples in total, were measured. A tape marked with a cross was evaluated "unacceptable."

Width dimension change rate(ppm)=$10^6 \times (|IC-ID|/IC)$

Double circle: The maximum value of width dimension change rate is less than 80 (ppm).
Single circle: The maximum value of width dimension change rate is 80 (ppm) to less than 100 (ppm).
Triangle: The maximum value of width dimension change rate is 100 (ppm) to less than 150 (ppm).
Cross: The maximum value of width dimension change rate is 150 (ppm) or more.

(10) Running Durability

A cassette tape prepared as described in the abovementioned section (8) was driven to run 300 times using commercially available LTO drive 3580-L11 produced by IBM in an environment of 23° C. and 65% RH for evaluation. The error rate was calculated from the following formula using the error information (number of error bits) outputted from the drive. A tape marked with cross was evaluated "unacceptable."

Error rate=(Number of error bits)/(Number of bits tried to be written)

Double circle: The error rate is less than $1.0 \times 10^{-6}$.
Single circle: The error rate is $1.0 \times 10^{-6}$ to less than $1.0 \times 10^{-5}$.
Triangle: The error rate is $1.0 \times 10^{-5}$ to less than $1.0 \times 10^{-4}$.
Cross: The error rate is $1.0 \times 10^{-4}$ or more.

(11) Electromagnetic Conversion Property

A cassette tape prepared as described in the abovementioned section (8) was measured. For measuring C/N, a reel-to-reel tester mounted with a commercially available MR head was used under the following conditions.

Relative speed: 2 m/sec
Recording track width: 18 μm
Reproducing track width: 10 μm
Shield-to-shield distance: 0.27 μm
Signal generator for recording: 8118A produced by HP
Reproduced signal processing: Spectrum analyzer The C/N was compared with that of commercially available LTO4 tape (produced by Fujifilm Corporation), and evaluated according to the following criterion.

Double circle: −0.5 dB or more
Single circle: −1 dB to less than −0.5 dB
Triangle: −2 dB to less than −1 dB
Cross: Less than −2 dB
"Double circle" and "Single circle" are desirable, and even "Triangle" allows practical use.

(12) Void Rate Inside the Film

A cross section of a film was obtained by cutting, and metallized with platinum-palladium. Then, scanning electron microscope S-2100A produced by Hitachi, Ltd. was used to observe the internal structure of the film at a magnification to allow sufficient observation in a range from 2,000× to 10,000×. The image was used to obtain the area of voids per unit cross sectional area, and the area occupancy rate of voids was calculated. This determination was repeated at 10 points at random, and the mean value was employed as the void rate (%) inside the film.

(13) Refractive Index

The refractive index was measured by an Abbe refractometer using sodium D-line as a light source according to the method specified in JIS KI 7105 (1981). Meanwhile, methylene iodide was used as a mount liquid, and measurement was made at 25° C. and 65% RH. Meanwhile, the machine direction of the sample is the direction in which the film is formed, and in the case of a magnetic tape or the like, the machine direction of the sample agrees with the machine direction of the tape. The transverse direction is the direction perpendicular to the machine direction. The mean value of the refractive index in the machine direction and the refractive index in the transverse direction was calculated from the following formula.

Mean value of the refractive index in the machine direction and the refractive index in the transverse direction=(Refractive index in the machine direction+Refractive index in the transverse direction)/2

This determination was repeated at 10 points at random, and the mean value was employed as the mean value of refractive indexes of the film.

(14) Measurement of Resin Content of the Film

The film was weighed and dissolved into a mixed solvent consisting of hexafluoroisopropanol (HFIP)/chloroform (ratio by mass 50/50). When there was insoluble matter, the insoluble matter was separated by centrifugation and the mass of the insoluble matter was measured. Further, the structure and the mass rate of the insoluble matter were determined by elementary analysis, FT-IR and NMR. If the supernatant matter is also analyzed likewise, the mass rates and structure of the polyester component and other components can be specified. In detail, the solvent is distilled away from the supernatant matter, and the residue is dissolved into a mixed solvent consisting of HFIP/deuterated chloroform (ratio by mass 50/50), the NMR spectrum of $^1$H-nuclei being measured.

From the obtained spectrum, the peak area intensities of the absorption species (for example, aromatic protons of terephthalic acid in case of PET, aromatic protons of bisphenol A in case of PEI) peculiar to respective components are obtained, and the molar ratio of the blend is calculated from the ratio of the peak area intensities and the numbers of protons. Further, from the formula weights corresponding to the units of the polymer, the mass ratio is calculated. In this manner, the mass rates of respective components and the structure can be specified.

(15) Haze Value of a Film

The haze value was measured using a haze meter (HZ-2 produced by Suga Test Instruments Co., Ltd.) on the basis of JIS K 7105 (1985). Further, the film was placed in a quartz cell for liquid measurement, and the cell was filled with liquid paraffin, to measure the inside haze without the film surface haze. This measurement was made at 10 points at random, and the mean value was employed as the haze value of the film.

(16) Electromagnetic Conversion Property after Storing for a Long Period

A cassette tape prepared as described in the abovementioned section (8) was measured. For measuring C/N, a reel-to-reel tester mounted with a commercially available MR head was used under the following conditions as described in the above section (11), except that the cartridge was stored in an environment of 40° C. and 20% RH for 100 days.
Relative speed: 2 m/sec
Recording track width: 18 μm
Reproducing track width: 10 μm
Shield-to-shield distance: 0.27 μm
Signal generator for recording: 8118A produced by HP
Reproduced signal processing: Spectrum analyzer The C/N was compared with that of the tape not yet stored in an environment of 40° C. and 20% RH for 100 days, and evaluated according to the following criterion.
Double circle: −1 dB or more
Single circle: −2 dB to less than −1 dB
Triangle: −3 dB to less than −2 dB
Cross: Less than −3 dB
"Double circle" and "Single circle" are desirable, and even "Triangle" allows practical use.

(17) Running Durability at High Humidity after Storing for a Long Period

A cassette tape prepared as described in the abovementioned section (8) was driven to run 300 times using commercially available LTO drive 3580-L11 produced by IBM in an environment of 40° C. and 80% RH for evaluation as described in the abovementioned section (10), except that the cartridge was stored in an environment of 40° C. and 20% RH for 100 days. The error rate was calculated from the following formula using the error information (number of error bits) outputted from the drive. Two marks and higher marks are acceptable.

Error rate=(Number of error bits)/(Number of bits tried to be written)

5 marks: The error rate is less than $1.0 \times 10^{-6}$
4 marks: The error rate is $1.0 \times 10^{-6}$ and less than $1.0 \times 10^{-4}$.
3 marks: The error rate is $1.0 \times 10^{-5}$ to less than $1.0 \times 10^{-4}$.
2 marks: The error rate is $1.0 \times 10^{-4}$ to less than $1.0 \times 10^{-3}$.
1 mark: The error rate is $1.0 \times 10^{-3}$ to less than $1.0 \times 10^{-2}$.

(18) Determination of the Island Domains with a Diameter of 1 to 30 nm

A film was cut (A) in the direction parallel to the machine direction and perpendicular to the film surface, (B) in the direction parallel to the transverse direction and perpendicular to the film surface, and (C) in the direction parallel to the film surface, to prepare extra-thin section samples. In order to clarify the contrast of the island domains, osmic acid, ruthenic acid, phosphorus tungstic acid or the like may also be used for staining. A cut surface was observed at an accelerating voltage of 100 kV using a transmission electron microscope (H-7100FA produced by Hitachi), and a photo was taken at a magnification of 500,000×. The obtained photo was inputted as an image into an image analyzer, and image-processed as required, to obtain the diameters of island domains as described below. The longest length (La) of each island domain found in the cut surface of (A) in the film thickness direction and the longest length (Lb) of the island domain in the machine direction, the longest length (Lc) of the island domain found in the cut surface of (B) in the film thickness direction and the longest length (Ld) of the island domain in the transverse direction, and the longest length (Le) of the island domain found in the cut surface of (C) in the machine direction and the longest length (Lf) of the island domain in the transverse direction, were obtained. Then, the diameter of the island domain was calculated from $(I+J+K)/3$, where $I=(Lb+Le)/2$ as a shape index of the island domain, $J=(Ld+Lf)/2$ as another shape index of the island domain, and $K=(La+Lc)/2$ as a further other shape index of the island domain.

Meanwhile, the method employed in the case where image analysis is performed is described below.

The transmission electron microscope photo of each sample was inputted into the computer by a scanner. Then, a special software (Image Pro Plus Ver. 4.0 produced by Planetron) was used to perform image analysis. The Tone Curve was operated to adjust the brightness and the contrast. Subsequently the island domains corresponding to the high contrast component of the image obtained by using a Gaussian filter were observed, and the diameter of each island domain was calculated by the abovementioned calculation method. In the case where a negative photo was used as the transmission electron microscope photo, Leafscan 45 Plug-In produced by Nippon Scitex was used as the abovementioned scanner, and in the case where a positive photo was used as the transmission electron microscope photo, GT-76005 produced by Seiko Epson Corporation was used as the abovementioned scanner. In both the cases, equivalent values can be obtained.
Image Processing Procedure and Parameters:
Flattening, once
Contrast +30
Gaussian, once
Contrast +30, luminance −10
Gaussian, once
Flattening filter: Background (black), object width (20 pix)
Gaussian filter: Size (7), strength (10)

EXAMPLES

The modes for carrying out this invention are explained below on the basis of the following examples.

Reference Example 1

An ester interchange reactor was charged with 194 parts by mass of dimethyl terephthalate and 124 parts by mass of ethylene glycol, and the content was heated at 140° C., to be dissolved. Subsequently, while the content was stirred, 0.3 part by mass of magnesium acetate tetrahydrate and 0.05 part by mass of antimony trioxide were added. While methanol was distilled away at 140 to 230° C., an ester interchange reaction was performed. Then, 1 part by mass of an ethylene glycol solution containing 5 mass % of trimethyl phosphate (0.05 part by mass as trimethyl phosphate) was added. When the ethylene glycol solution of trimethyl phosphate was added, the temperature of the reaction mixture declined. Accordingly, while extra ethylene glycol was distilled away, the reaction mixture was continuously stirred till the temperature of the reaction mixture returned to 230° C. After the temperature of the reaction mixture in the ester interchange reactor reached 230° C. by doing so, the reaction mixture was transferred to a polymerization reactor. After completion of transfer, the reaction system was gradually heated from 230° C. to 290° C., and the pressure was lowered to 0.1 kPa. The time taken to reach the final temperature and the time taken to reach the final pressure were both 60 minutes. After the final temperature and the final pressure were reached, the reaction was performed for 2 hours (3 hours from the start of polymerization), when the stirring torque of the polymerization reactor showed a predetermined value (the particular value is different depending on the specifications of the polymerization reactor, and the value shown by polyethylene terephthalate with an intrinsic viscosity of 0.62 in this polymerization reactor was employed as the predetermined value). So, the reaction system was purged using nitrogen for returning to atmospheric pressure, to terminate the polycondensation reaction. The polymer was discharged as a strand into cold water and immediately cut to obtain polyethylene terephthalate (PET) pellets (X) with an intrinsic viscosity of 0.62.

Reference Example 2

The PET pellets (X) obtained in Reference Example 1 were dried at 160° C. and at a reduced pressure of 3 mm Hg for 4 hours, and subsequently a solid phase polymerization was performed at 220° C. and at a reduced pressure of 133 Pa or less for 8 hours, to obtain PET pellets (Y) with an intrinsic viscosity of 1.2.

Reference Example 3

Fifty parts by mass of the pellets of PEI "Ultem 1010-1000" produced by SABIC Innovative Plastics and the PET pellets (Y) were separately dried at 180° C. and at a reduced pressure of 3 mm Hg for 6 hours.

In a vented twin-screw kneading extruder with a screw diameter of 30 mm and a screw length/screw diameter ratio of 45.5, having three kneading paddle sections, with screws rotatable in the same direction, produced by The Japan Steel Works, Ltd., a temperature gradient from 270° C. to 320° C. was established from the screw zone to the extrusion head zone. The pellets dried under reduced pressure were supplied into the extruder, and the blend was melt-extruded at a screw rotational speed of 300 rpm with a residence time of 3 minutes and discharged as a strand, and the strand was cooled by water with a temperature of 25° C. and immediately cut to prepare PET-PEI (UI1010) blend pellets (Z).

Example 1

Seventy five parts by mass of the pellets of PEI "Ultem 1010-1000" (Tg=215° C.) produced by SABIC Innovative Plastics and 25 parts by mass of the pellets of PEI "Ultem CRS5011-1000" (Tg=225° C.) produced by SABIC Innovative Plastics were separately dried at 150° C. and at a reduced pressure of 3 mm Hg for 6 hours.

In a vented twin-screw kneading extruder with a screw diameter of 30 mm and a screw length/screw diameter ratio of 45.5, having three kneading paddle sections, with screws rotatable in the same direction, produced by The Japan Steel Works, Ltd., a temperature gradient from 320° C. to 380° C. was established from the screw zone to the extrusion head zone. The pellets dried under reduced pressure were supplied into the extruder, and the blend was melt-extruded at a screw rotational speed of 300 rpm with a residence time of 3 minutes and discharged as a strand, and the strand was cooled by water with a temperature of 10° C. and immediately cut to prepare PEI (UI1010)-PEI (CRS5011) (mixing ratio 75/25) blend pellets (I).

Then, 50 parts by mass of the PET pellets (Y) and 50 parts by mass of the blend pellets (I) were separately dried at 180° C. and at a reduced pressure of 3 mm Hg for 3 hours, and subsequently supplied to the abovementioned extruder in which a temperature gradient from 270° C. to 320° C. was established from the screw zone to the extrusion head zone, and similarly supplied into a vented twin-screw kneading extruder having three kneading paddle sections with screws rotatable in the same direction and heated to a temperature of 310° C. (with a screw diameter of 30 mm and a screw length/screw diameter ratio of 45.5, produced by The Japan Steel Works, Ltd.), being melt-extruded at a screw rotational speed of 300 rpm and discharged as a strand, and the strand was cooled by water with a temperature of 25° C. and immediately cut to prepare PET-PEI (UI1010)-PEI (CRS5011) blend pellets (II).

Then, 88 parts by mass of the PET pellets (X), 4 parts by mass of the blend pellets (Z) and 8 parts by mass of the blend pellets (II) were mixed to achieve the contents (mass %) shown in Table 2, and the mixture was dried at 180° C. and at a reduced pressure of 3 mm Hg for 3 hours, and supplied into an extruder, being melt-extruded at 300° C. and passed through a fiber stainless steel filter (14 μm cut), then discharged from a T die as a sheet. The sheet was brought into contact with a cooling drum with a surface temperature of 25° C. by electrostatic application, to be solidified and cooled, thereby obtaining a cast film. The Tg of the cast film was 83° C.

With both the edges of the cast film held by clips, the cast film was introduced into a simultaneous biaxial stretching tenter using linear motors to drive the clips. The film was heated to 95° C. and simultaneously biaxially stretched at an area stretching ratio of 12.25 times (longitudinal ratio 3.5 times, lateral ratio 3.5 times). In succession, at a film temperature of 160° C., re-stretching was performed at an area stretching ratio of 2.16 times (longitudinal ratio 1.2 times, lateral ratio 1.8 times), followed by heat-set treatment at a heat-set temperature of 210° C. for 2 seconds, then by relaxation heat treatment I at the heat-set temperature by 2% in the machine direction and in the transverse direction, and subsequently by relaxation heat treatment II in two steps of 150° C. and 100° C. by 4% in the machine direction and by 2% in the transverse direction, to obtain a 5 μm thick biaxially stretched polyester film. The composition, properties, etc. of the biaxially oriented polyester film are as shown in Tables 1 to 3. The film has excellent properties as a base film of a magnetic recording medium.

Examples 2 and 3

Biaxially oriented polyester films were obtained as described in Example 1, except that the PET pellets (Y) were used instead of the PET pellets (X) and that the resins shown in Table 2 were used instead of the PEI "Ultem CRS5011-1000" produced by SABIC Innovative Plastics. The compositions, properties, etc. of these biaxially oriented films are as shown in Tables 1 to 3. The films have excellent properties as base films of magnetic recording media.

Example 4

PEI (UI1010)-PEI (CRS5011) (mixing ratio 10/90) blend pellets (III) were prepared in the same way as that of the blend pellets (I) of Example 1. Further, PET-PEI (UI1010)-PEI (CRS5011) blend pellets (mixing ratio 25/7.5/67.5) (IV) were prepared from 25 parts by mass of the PET pellets (Y) and 75 parts by mass of the blend pellets (III) as described in Example 1. Then, 58.6 parts by mass of the PET pellets (X), 4.4 parts by mass of the blend pellets (Z) and 37.0 parts by mass of the blend pellets (IV) were mixed to achieve the contents (mass %) shown in Table 2, to obtain a 5 μm thick biaxially stretched polyester film as described in Example 1. The composition, properties, etc. of the biaxially oriented polyester film are as shown in Tables 1 to 3. The film has excellent properties as a base film of a magnetic recording medium.

Example 5

PEI (UI1010)-PEI (CRS5011) (mixing ratio 25/75) blend pellets (V) were prepared in the same way as that of the blend pellets (I) of Example 1. Further, PET-EEI (UI1010)-PEI (CRS5011) blend pellets (mixing ratio 25/18.75/56.25) (VI) were prepared from 25 parts by mass of the PET pellets (Y) and 75 parts by mass of the blend pellets (III) as described in Example 1. Then, 76.7 parts by mass of the PET pellets (X), 2.0 parts by mass of the blend pellets (Z) and 21.3 parts by mass of the blend pellets (VI) were mixed to achieve the contents (mass %) shown in Table 2, to obtain a 5 μM thick biaxially stretched polyester film as described in Example 1. The composition, properties, etc. of the biaxially oriented polyester film are as shown in Tables 1 to 3. The film has excellent properties as a base film of a magnetic recording medium.

Examples 6, 8 and 9

Biaxially oriented polyester films were obtained as described in Example 1, except that the PEN pellets obtained by an ordinary method or the PET pellets (Y) were used instead of the PET pellets (X) and that the resins shown in Table 2 were used in stead of PEI "Ultem CRS5011-1000" produced by SABIC Innovative Plastics in Examples 8 and 9. The compositions, properties, etc. of these biaxially oriented polyester films are as shown in Tables 1 to 3. The films have excellent properties as base films of magnetic recording media.

Example 7

A cast film obtained as described in Example 1 was stretched by a roll-type stretching machine to 3.0 times in the machine direction at a temperature of 105° C., further stretched by a tenter to 2.8 times in the transverse direction at a temperature of 110° C. In succession, a roll-type stretching machine was used for re-stretching to 1.5 times in two steps in the machine direction at a temperature of 150° C., and a tenter was used for re-stretching to 1.8 times in the transverse direction at a temperature of 190° C. Further, heat treatment was performed under a constant length at a temperature of 200° C. for 10 seconds, following by 1% relaxation treatment in the transverse direction, to obtain a 5 μm thick biaxially oriented polyester film. The composition, properties, etc. of the biaxially oriented polyester film are as shown in Tables 1 to 3. The film has excellent properties as a base film of a magnetic recording medium.

Example 10

Forty nine point seven parts by mass of the PET pellets (X), 2.9 parts by mass of the blend pellets (Z) and 47.4 parts by mass of the blend pellets (IV) were mixed as described in Example 4, to achieve the contents (mass %) shown in Table 2, for obtaining a 5 μm thick biaxially stretched polyester film as described in Example 1. The composition, properties, etc. of the biaxially oriented polyester film are as shown in Tables 1 to 3. The film has excellent properties as a base film of a magnetic recording medium.

Comparative Example 1

The PET pellets (X) were dried at 180° C. and at a reduced pressure of 3 mm Hg for 3 hours, and supplied into an extruder, being melt-extruded at 285° C., and passed through a fiber stainless steel filter (14 μm cut), and subsequently discharged from a T die as a sheet. The sheet was brought into contact with a cooling drum with a surface temperature of 25° C. by electrostatic application, to be solidified and cooled, for obtaining a cast film. The Tg of the cast film was 78° C.

With both the edges of the cast film held by clips, the film was introduced into a simultaneous biaxial stretching tenter using linear motors to drive the clips. The film was heated to 95° C. and simultaneously biaxially stretched at an area stretching ratio of 12.25 times (longitudinal ratio 3.5 times, lateral ratio 3.5 times). In succession, at a film temperature of 160° C., re-stretching was performed at an area stretching ratio of 2.16 times (longitudinal ratio 1.2 times, lateral ratio 1.8 times), followed by heat-set treatment at a heat-set temperature of 210° C. for 2 seconds, then by relaxation heat treatment I at the heat-set temperature by 2% in the machine direction and the transverse direction, and subsequently by relaxation heat treatment II in two steps of 150° C. and 100° C. by 4% in the machine direction and by 2% in the transverse direction, to obtain a 5 μm thick biaxially stretched polyester film. The composition, properties, etc. of the biaxially oriented polyester film are shown in Tables 1 to 3.

Comparative Example 2

PEI (UI1010)-PEI (CRS5011) (mixing ratio 5/95) blend pellets (VII) were prepared in the same was as that of the blend pellets (I) of Example 1. Further, as described in Example 1, PET-PEI (UI1010)-PEI (CRS5011) blend pellets (mixing ratio 25/3.75/71.25) (VIII) were prepared from 25 parts by mass of the PET pellets (Y) and 75 parts by mass of the blend pellets (III). Then, 25.1 pars by mass of the PET pellets (X), 4.7 parts by mass of the blend pellets (Z) and 70.2 parts by mass of the blend pellets (IV) were mixed to achieve the contents (mass %) shown in Table 2, to obtain a 5 μm thick biaxially stretched polyester film as described in Example 1. The composition, properties, etc. of this biaxially oriented polyester film are shown in Tables 1 to 3. The film has excellent properties as a base film of a magnetic recording medium.

The cast film was stretched by a roll-type stretching machine to 3.2 times in the machine direction at a temperature of 150° C., and subsequently stretched by a tenter to 4.5 times in the transverse direction at a temperature of 155° C., further being re-stretched by a roll-type stretching machine to 1.6 times in the machine direction at a temperature of 155° C. It was tried to further re-stretch the film using a tenter to 1.1 times in the transverse direction at a temperature of 195° C., but stretching breaking occurred frequently, not allowing a sample to be obtained.

Comparative Example 3

Two extruders were used. A blend polymer (containing 0.03 mass % of crosslinked polymer particles with an average particle size of 0.3 μm and 0.12 mass % of aluminum silicate particles with an average particle size of 0.2 μm) consisting of 10 mass % of PSU "UDEL P-3900" produced by Solvay Advanced Polymers and 90 mass % of PET pellets with an intrinsic viscosity of 0.85 obtained by an ordinary method was dried at 180° C. under reduced pressure for 3 hours and then supplied into an extruder A heated to 280° C. Separately, PET pellets were dried at 180° C. under reduced pressure for 3 hours and then supplied into an extruder B heated to 280° C. Subsequently the blend polymer and the PET were joined in a T die (lamination ratio 6.0/0.5), and the discharged sheet was brought into contact with a casting drum with a surface temperature of 25° C. while electrostatic charges were applied to the drum, to be cooled and solidified, for preparing a layered cast film.

The cast film was stretched by a roll-type stretching machine to 3.2 times in the machine direction at a temperature of 97° C., and then stretched by a tenter to 4.5 times in the transverse direction at a temperature of 103° C., further being re-stretched by a roll-type stretching machine to 1.6 times in the machine direction at a temperature of 155° C., and re-stretched by a tenter to 1.1 times in the transverse direction at a temperature of 195° C. Subsequently it was heat-treated under a constant length at a temperature of 210° C. for 10 seconds and subjected to 2% relaxation treatment in the transverse direction, to obtain a 6.5 μm thick layered biaxially oriented polyester film. The composition, properties, etc. of the biaxially oriented polyester film are as shown in Tables 1 to 3.

Comparative Example 4

Two extruders were used. A blend polymer (containing 0.1 mass % of spherical silica particles with an average particle size of 0.25 μm and 0.5 mass % of alumina particles with an average particle size of 0.02 μm) consisting of 10 mass % of PEI "Ultem 1010-1000" produced by SABIC Innovative Plastics, 5 mass % of PES "RADEL A Grade A-300A" produced by Solvay Advanced Polymers and 85 mass % of PEN was dried at 180° C. under reduced pressure for 3 hours and then supplied into an extruder A heated to 280° C. Separately PEN was dried at 180° C. under reduced pressure for 3 hours and then supplied into an extruder B heated to 280° C. Subsequently the blend polymer and PEN were joined in a T die (lamination ratio 8.5/1.0), and the discharged sheet was brought into contact with a casting drum with a surface temperature of 25° C. while electrostatic charges were applied to the drum, to be cooled and solidified, for preparing a layered cast film.

The cast film was stretched by a roll-type stretching machine to 3.2 times in the machine direction at a temperature of 150° C., and then stretched by a tenter to 4.5 times in the transverse direction at a temperature of 155° C., being further re-stretched by a roll-type stretching machine to 1.6 times in the machine direction at a temperature of 155° C. It was tried to further re-stretch the film by a tenter to 1.1 times in the transverse direction at a temperature of 195° C., but stretching breaking occurred frequently, not allowing a sample to be obtained.

Comparative Example 5

Seventy five mass % of PEI "Ultem 1010" produced by SABIC Innovative Plastics and 25 mass % of PAR "U Polymer U-100" produced by Unitika, Ltd. were supplied into a vented twin-screw kneading extruder provided with two triple-thread screws and heated to 350° C., and melt-kneaded with a residence time of 3 minutes, to obtain PEI-PAR blend pellets. Then, 60 mass % of PET pellets with an intrinsic viscosity of 0.65 and 40 mass % of the PEI-PAR blend pellets obtained by the abovementioned pelletization operation were dried at 180° C. under reduced pressure for 3 hours, and supplied into a single screw extruder equipped with a screw having a diameter of 150 mm and heated to 290° C., melt-extruded, and passed through a fiber stainless steel filter (5 μm cut) at a shear rate of 10 sec$^{-1}$, being discharged from a T die as a sheet. The sheet was brought into contact with a cooling drum with a surface temperature of 25° C. at a draw-down ratio of 10 and at a speed of 30 m/min, to be solidified and quickly cooled, for obtaining a substantially non-oriented cast film. In succession, the cast film was stretched by a longitudinal stretcher comprising heated multiple rolls using the peripheral speed difference of the rolls, to 3.8 times in the machine direction of the film at a temperature of 110° C. Then, with both the edges of the film held by clips, the film was introduced into a tenter, being stretched at a stretching temperature of 115° C. and at a stretching ratio of 4 times in the transverse direction of the film, in succession heat-treated at a temperature of 235° C., subjected to 3% and 1% relaxation treatments in the transverse direction in two cooling zones controlled at 150° C. and 100° C., and cooled to room temperature. Then, the edges of the film were removed, to obtain a 100 μm thick biaxially oriented film. The composition, properties, etc. of the biaxially oriented polyester film are as shown in Tables 1 to 3.

Comparative Example 6

Fifty mass % of the pellets of polyethylene terephthalate (intrinsic viscosity 0.85) obtained by a conventional method and 50 mass % of polyether imide pellets ("Ultem" 1010 (registered trademark, produced by SABIC Innovative Plastics) were supplied into a vented twin-screw kneading extruder heated to 280° C. and melt-extruded, to obtain chips (I) containing 50 mass % of polyetherimide. The obtained polyetherimide-containing chips (I) and polyethylene terephthalate (intrinsic viscosity 0.62) were dry-blended at a ratio of 40:60, and the blend was dried at 180° C. under reduced pressure for 3 hours and then supplied into an extruder heated to 285° C. The blend was passed through a fiber stainless steel filter (5 μm cut) at a shear rate of 10 sec$^{-1}$, and subsequently discharged from a T die as a sheet. The sheet was brought into contact with a cooling drum with a surface temperature of 25° C. at a speed of 5 m/min, to be cooled and solidified. The obtained cast film was a white cloudy film poor in clarity. The cast film was biaxially stretched by a conventional method, to obtain a biaxially oriented film. The average island domain size of polyetherimide in the obtained film was 150 nm, and the film obtained was inferior in 100° C. heat shrinkage rate.

Comparative Example 7

Fifty parts by mass of the PET pellets (X) and 50 parts by mass of PEI "Ultem 1010-1000" produced by SABIC Innovative Plastics were dehumidified and dried at 150° C. for 5 hours, and subsequently supplied into a vented twin-screw extruder (L/D=40, the reduced pressure of the vent hole was set at 200 Pa) equipped with two triple-thread screws (PET and PEI kneading and plasticizing zone/Dulmage kneading zone/fine dispersing and compatibilizing zone by reverse flight Dulmage) and heated to a range from 320 to 290° C. (the temperature gradient was set in the screw zone and the extrusion head zone), and melt-extruded with a residence time of 3 min, to obtain PET/PEI blend chips containing 50 mass % of PEI.

Subsequently the obtained PET/PEI blend chips and the PET pellets (X) were mixed to achieve the contents (mass %) shown in Tables 1 to 3, and the mixture was dried at 180° C. at a reduced pressure of 3 mm Hg for 3 hours, and then supplied into an extruder, melt-extruded at 285° C., passed through a fiber stainless steel filter (14 μm cut), then being discharged from a T die as a sheet. The sheet was brought into contact with a cooling drum with a surface temperature of 25° C. by electrostatic application, to be solidified and cooled, for obtaining a cast film.

With both the edges of the cast film held by clips, the film was introduced into a simultaneous biaxial stretching tenter using linear motors. The film was heated to 95° C. and stretched simultaneously biaxially at an area stretching ratio of 12.25 times (longitudinal ratio 3.5 times, lateral ratio 3.5 times). In succession, at a film temperature of 160° C., re-stretching was performed at an area stretching ratio of 2.16 times (longitudinal ratio 1.2 times, lateral ratio 1.8 times), followed by heat-set treatment at a heat-set temperature of 210° C. for 2 seconds, then by relaxation treatment I at the heat-set temperature by 2% in the machine direction and in the transverse direction, and subsequently by relaxation treatment II in two steps of 150° C. and 100° C. by 4% in the machine direction and by 2% in the transverse direction, to obtain a 5 μm thick biaxially stretched polyester film. The composition, properties, etc. of the biaxially oriented polyester film are as shown in Tables 1 to 3.

Example 11

As described in Example 1, the blend pellets (II) were prepared.

Then, 80 parts by mass of the PET pellets (X) and 20 parts by mass of the blend pellets (II) were mixed to achieve the contents (mass %) shown in Table 2, and the mixture was dried at 180° C. and at a reduced pressure of 3 mm Hg for 3 hours, then supplied into an extruder, melt-extruded at 300° C., passed through a fiber stainless steel filter (14 μm cut), then being discharged from a T die as a sheet. The sheet was brought into contact with a cooling drum with a surface temperature of 25° C. by electrostatic application, to be solidified and cooled, for obtaining a cast film. The Tg of the cast film was 85° C.

With both the edges of the cast film held by clips, the film was introduced into a simultaneous biaxial stretching tenter using linear motors. The film was heated to 97° C. and stretched simultaneously biaxially at an area stretching ratio of 12.25 times (longitudinal ratio 3.5 times, lateral ratio 3.5 times). In succession, at a film temperature of 160° C., re-stretching was performed at an area stretching ratio of 2.16 times (longitudinal ratio 1.2 times, lateral ratio 1.8 times), followed by heat-set treatment at a heat-set temperature of 210° C. for 2 seconds, then by relaxation heat treatment I at the heat-set temperature by 2% in the machine direction and in the transverse direction, and subsequently by relaxation treatment II in two steps of 150° C. and 100° C. by 4% in the machine direction and by 2% in the transverse direction, to obtain a 5 μm thick biaxially stretched polyester film. The composition, properties, etc. of the biaxially oriented polyester film are as shown in Tables 1 to 3. The film has excellent properties as a base film of a magnetic recording medium.

Example 12

PEI (UI1010)-PEI (CRS5011) (mixing ratio 40/60) blend pellets (XI) were prepared in the same way as that of the blend pellets (I) of Example 1. Further, PET-PEI (UI1010)-PEI (CRS5011) blend pellets (mixing ratio 50/20/30) (XII) were prepared from 50 parts by mass of the PET pellets (X) and 50 parts by mass of the blend pellets (XI) as described in Example 1. Then, 91.7 parts by mass of the PET pellets (X) and 8.3 parts by mass of the blend pellets (XII) were mixed to achieve the contents (mass %) shown in Table 2, and as described in Example 1, a 5 μm thick biaxially stretched polyester film was obtained. The composition, properties, etc.

of the biaxially oriented polyester film are shown in Tables 1 to 3. The film has excellent properties as a base film of a magnetic recording medium.

Example 13

Eighty three parts by mass of PEI "Ultem 1040A-1000" (250 Pa·s as melt viscosity at 355° C. and 300 (1/sec)) produced by SABIC Innovative Plastics, 17 parts by mass of polyetheretherketone (PEEK) "VICTREX PEEK 90G" (410 Pa·s as melt viscosity at 355° C. and 300 (1/sec)) and 1.0 part by mass of γ-isocyanate propyltriethoxysilane "KBE9007" produced by Shin-Etsu Chemical Co., Ltd.) were supplied into a vented twin-screw extruder (L/D=40, the reduced pressure of the vent hole was set at 200 Pa) equipped with two triple-thread screws (PEI and PEEK kneading and plasticizing zone/Dulmage kneading zone/fine dispersing and compatibilizing zone by reverse flight Dulmage) and heated to a range from 320 to 380° C. (the temperature gradient was set in the screw zone and the extrusion head zone), and melt-extruded with a residence time of 3 minutes, to obtain blend pellets of PEI/PEEK/compatibilizing agent containing 17 mass % of PEEK resin. Further, a mixture consisting of 100 parts by mass of the obtained PEI/PEEK/compatibilizing agent blend pellets and 3 parts by mass of ion exchange water was melt-extruded using a twin-screw extruder heated to a range from 320 to 380° C. The obtained pellets are called blend pellets A (1.900 Pa·s as melt viscosity at 315° C. and 300 (1/sec)).

Then, 10 parts by mass of the blend pellets A and 90 parts by mass of the PET pellets (Y) obtained in Reference Example 2 were supplied into a twin-screw extruder heated to a range from 200 to 350° C., and melt-extruded.

In this case, a vented twin-screw extruder (L/D=40) having 15 cylinder zones was used for the melt extrusion. In order to inhibit the thermal deterioration of PET, the blend pellets A were supplied into cylinder No. 1, and after sufficiently melting them in cylinders Nos. 2 to 5 at 310 to 350° C., the PET pellets (Y) were supplied into cylinder No. 6. In cylinders Nos. 7 to 15, the blend pellets A and the PET pellets (Y) were mixed at 200 to 300° C., to obtain PET/PEI/PEEK blend pellets. The obtained blend pellets are called blend pellets B (300 Pa·s as melt viscosity at 315° C. and 300 (1/sec)).

Then, 0.2 part by mass of the PET/PEI blend pellets (Z) obtained in Reference Example 3, 58.8 parts by mass of the PET/PEI/PEEK blend pellets B and 41 parts by mass of the PET pellets (X) obtained in Reference Example 1 were mixed, and the mixture was dried at 180° C. under reduced pressure for 3 hours and then supplied into an extruder, melt-extruded at 300° C., passed through a fiber stainless steel filter (14 μm cut), then being discharged from a T die as a sheet. The sheet was brought into contact with a cooling drum with a surface temperature of 25° C. by electrostatic application, to be solidified and cooled, for obtaining a cast film.

With both the edges of the cast film held by clips, the film was introduced into a simultaneous biaxial stretching tenter using linear motors. The film was heated to 95° C., and stretched simultaneously biaxially at an area stretching ratio of 12.25 times (longitudinal ratio 3.5 times, lateral ratio 3.5 times). In succession, at a film temperature of 160° C., re-stretching was performed at an area stretching ratio 2.16 times (longitudinal ratio 1.2 times, lateral ratio 1.8 times), followed by heat-set treatment at a heat-set temperature of 210° C. for 2 seconds, then by relaxation heat treatment I at the heat-set temperature by 2% in the machine direction and in the transverse direction, and subsequently by relaxation heat treatment II in two steps of 150° C. and 100° C. by 4% in the machine direction and by 2% in the transverse direction, to obtain a 5 μm thick biaxially stretched polyester film. The composition, properties, etc. of the biaxially oriented polyester film are as shown in Tables 1 to 3. The film has excellent properties as a base film of a magnetic recording medium.

Example 14

Eighty three parts by mass of PEI "Ultem 1040A-1000" (250 Pa·s as melt viscosity at 355° C. and 300 (1/sec)) produced by SABIC Innovative Plastics, 17 parts by mass of polycarbonate (PC) resin "Calibre 301-4" produced by Sumitomo Dow and 1.0 part by mass of γ-isocyanate propyltriethoxysilane "KBE9007" produced by Shin-Etsu Chemical Co., Ltd. as a compatibilizing agent were supplied into a vented twin-screw extruder (L/D=40, the reduced pressure of the vent hole was set at 200 Pa) equipped with two triple-thread screws (PEI and PEEK kneading and plasticizing zone/Dulmage kneading zone/fine dispersing and compatibilizing zone by reverse flight Dulmage) and heated to a range from 320 to 380° C. (the temperature gradient was set in the screw zone and the extrusion head zone), and melt-extruded with a residence time of 3 minutes, to obtain blend pellets of PEI/PC/compatibilizing agent containing 17 mass % of PC resin. Further, a mixture consisting of 100 parts by mass of the obtained PEI/PC/compatibilizing agent blend pellets and 3 parts by mass of ion exchange water was melt-extruded using a twin-screw extruder heated to a range from 320 to 380° C. The obtained pellets are called blend pellets C.

Then, 10 parts by mass of the blend pellets C and 90 parts by mass of the PET pellets (Y) obtained in Reference Example 2 were supplied into a twin-screw extruder heated to a range from 200 to 350° C., to be melt-extruded.

In this case, for the melt extrusion, a vented twin-screw extruder (L/D=40) having 15 cylinder zones was used. In order to inhibit the thermal deterioration of PET, the blend pellets A were supplied into cylinder No. 1, and were sufficiently melted at 310 to 350° C. in cylinders Nos. 2 to 5. Then, the PET pellets (Y) were supplied into cylinder No. 6, and the blend pellets C and the PET pellets (Y) were mixed at 200 to 300° C. in cylinders Nos. 7 to 15. PET/PEI/PC blend pellets (D) were obtained.

Then, 0.2 part by mass of the PET/PEI blend pellets (Z) obtained in Reference Example 3, 58.8 parts by mass of the PET/PEI/PC blend pellets (D) and 41 parts by mass of the PET pellets (X) obtained in Reference Example 1 were mixed, and the mixture was dried at 180° C. under reduced pressure for 3 hours, and then supplied into an extruder, melt-extruded at 300° C., passed through a fiber stainless steel filter (14 μm cut), then being discharged from a T die as a sheet. The sheet was brought into contact with a cooling drum with a surface temperature of 25° C. by electrostatic application, to be solidified and cooled, for obtaining a cast film.

With both the edges of the cast film held by clips, the film was introduced into a simultaneous biaxial stretching tenter using linear motors. The film was heated to 95° C., and simultaneously biaxially stretched at an area stretching ratio of 12.25 times (longitudinal ratio 3.5 times, lateral ratio 3.5 times). In succession, at a film temperature of 160° C., re-stretching was performed at an area stretching ratio of 2.16 times (longitudinal ratio 1.2 times, lateral ratio 1.8 times), followed by heat-set treatment at a heat-set temperature of 210° C. for 2 seconds, then by relaxation heat treatment I at the heat-set temperature by 2% in the machine direction and in the transverse direction, and subsequently by relaxation heat treatment III in two steps of 150° C. and 100° C. by 4% in the machine direction and by 2% in the transverse direction, to obtain a 5 μm thick biaxially stretched polyester film. The composition, properties, etc. of the biaxially oriented polyester film are as shown in Tables 1 to 3. The film has excellent properties as a base film of a magnetic recording medium.

Example 15

Sixty parts by mass of the pellets of PEI "Ultem 1010-1000" (Tg=215° C.) produced by SABIC Innovative Plastics and 40 parts by mass of the pellets of PEI "Ultem CRS5011-1000" (Tg=225° C.) produced by SABIC Innovative Plastics were separately dried at 150° C. and at a reduced pressure of 3 mm Hg for 6 hours.

A vented twin-screw kneading extruder with a screw diameter of 44 mm, a screw length/screw diameter ratio of 45.5, having four kneading paddle sections, with screws rotatable in the same direction, produced by the Japan Steel Works, Ltd. was set at a temperature gradient from 320° C. to 350° C. in the screw zone to the extrusion head zone. The pellets dried under reduced pressure were supplied into the extruder, and the blend was melt-extruded at a screw rotational speed of 600 rpm, being discharged as a strand, and the strand was cooled by water with a temperature of 70° C. and immediately cut to prepare PEI (UI1010)-PEI (CRS5011) (mixing ratio 60/40) blend pellets (D).

Then, 50 parts by mass of the PET pellets (X) and 50 parts by mass of the blend pellets (D) were separately dried at 180° C. and at a reduced pressure of 3 mm Hg for 3 hours. The abovementioned extruder was set at a temperature gradient from 320° C. to 270° C. in the screw zone to the extrusion head zone. Fifty parts by mass of the dried PET pellets (X) and 50 parts by mass of the dried blend pellets (D) were simultaneously supplied into cylinder No. 1, and the blend was melt-extruded at a screw speed of 600 rpm, being discharged as a strand. The strand was cooled by water with a temperature of 10° C. and immediately cut, to prepare PET-PEI (UI1010)-PEI (CRS5011) blend pellets (E).

Then, 93.75 parts by mass of the PET pellets (X) and 12.5 parts by mass of the blend pellets (E) were mixed, and the mixture was dried at 180° C. and at a reduced pressure of 3 mm Hg for 3 hours and supplied into an extruder, melt-extruded at 280° C., and passed through a fiber stainless steel filter (14 μm cut), then being discharged from a T die as a sheet. The sheet was brought into contact with a cooling drum with a surface temperature of 25° C. by electrostatic application, to be solidified and cooled, for obtaining a cast film. The Tg of the cast film was 85° C.

The obtained cast film was sequentially biaxially stretched, at first in the machine direction and then in the transverse direction.

At first, the cast film was introduced into a longitudinal stretching apparatus comprising heated multiple rolls, and stretched to 3.3 times in the machine direction at a temperature of 90° C. Then, with both the edges of the film held by clips, the film was introduced into a stenter, and stretched to 3.5 times in the transverse direction at 95° C., and re-stretched to 1.6 times in the transverse direction at 180° C.

In succession, under a constant length, the film was heat-treated at 210° C. for 5 seconds, and in succession intermediately cooled, then being cooled to room temperature while being subjected to relaxation treatment in the machine and transverse directions, to be wound, for obtaining a 4.5 μm thick biaxially oriented polyester film.

The composition, properties, etc. of the biaxially oriented polyester film were as shown in Tables 1 to 3. The film has excellent properties as a base film of a magnetic recording medium.

Example 16

A cast film obtained as described in Example 15 was simultaneously biaxially stretched in the machine and transverse directions.

The cast film was simultaneously biaxially stretched by a simultaneous biaxial tenter having clips driven by linear motors to 3.5 times×3.5 times in the machine direction and in the transverse direction at a temperature of 95° C., and cooled to 70° C. In succession, the film was re-stretched simultaneously to 1.2 times×1.8 times in the machine direction and in the transverse direction at a temperature of 180° C. Then, heat-set treatment was performed at a heat-set temperature of 210° C. for 2 seconds, following by relaxation heat treatment I at the heat-set temperature by 2% in the machine direction and in the transverse direction, and subsequently by relaxation heat treatment II in two steps of 150° C. and 100° C. by 4% in the machine direction and by 2% in the transverse direction, to obtain a 4.5 μm thick biaxially stretched polyester film. The composition, properties, etc. of the biaxially oriented polyester film are as shown in Tables 1 to 3. The film has excellent properties as a base film of a magnetic recording medium.

Comparative Example 8

The cast film obtained as described in Comparative Example 1 was simultaneously biaxially stretched in the machine and transverse directions.

The cast film was stretched simultaneously by a simultaneous biaxial tenter having clips driven by linear motors to 3.5 times×3.5 times in the machine direction and in the transverse direction at a temperature of 95° C., and cooled to 70° C. In succession, it was tried to re-stretch the film simultaneously to 1.2 times×1.8 times in the machine direction and in the transverse direction at a temperature of 180° C., but stretching breaking occurred frequently, not allowing a sample to be obtained.

TABLE 1

| | Islands-in-sea structure | Average island domain size | Co-efficient of hygro-scopic expansion (ppm/% RH) | Haze value (%) | Void rate (%) | Average refractive index | Surface roughness Ra (nm) | Ten-point mean roughness Rz (nm) |
|---|---|---|---|---|---|---|---|---|
| Example 1 | Yes | 80 | 5.0 | 3 | 5 | 1.70 | 4 | 120 |
| Example 2 | Yes | 110 | 5.5 | 15 | 8 | 1.73 | 6 | 220 |
| Example 3 | Yes | 180 | 3.5 | 8 | 5 | 1.70 | 23 | 260 |

TABLE 1-continued

| | | | | | | | | |
|---|---|---|---|---|---|---|---|---|
| Example 4 | Yes | 150 | 5.0 | 50 | 20 | 1.61 | 22 | 240 |
| Example 5 | Yes | 100 | 4.5 | 30 | 10 | 1.67 | 8 | 230 |
| Example 6 | Yes | 40 | 3.5 | 5 | 3 | 1.83 | 2 | 60 |
| Example 7 | Yes | 80 | 5.5 | 20 | 8 | 1.69 | 5 | 100 |
| Example 8 | Yes | 150 | 4.0 | 8 | 5 | 1.75 | 18 | 260 |
| Example 9 | Yes | 125 | 5.5 | 40 | 15 | 1.64 | 15 | 330 |
| Example 10 | Yes | 200 | 6.0 | 60 | 30 | 1.56 | 35 | 300 |
| Comparative Example 1 | No | — | 6.3 | 1 | 1 | 1.59 | 4 | 70 |
| Comparative Example 2 | — | — | — | — | — | — | — | — |
| Comparative Example 3 | Yes | 350 | 7.0 | 55 | 40 | 1.60 | 9 | 560 |
| Comparative Example 4 | — | — | — | — | — | — | — | — |
| Comparative Example 5 | Yes | 25 | 6.5 | 8 | 5 | 1.60 | 15 | 320 |
| Comparative Example 6 | Yes | 150 | 6.5 | 80 | 50 | 1.58 | 30 | 350 |
| Comparative Example 7 | Yes | 4 | 6.2 | 5 | 2 | 1.6 | 5 | 130 |
| Example 11 | Yes | 105 | 4.7 | 4 | 5 | 1.72 | 4 | 130 |
| Example 12 | Yes | 130 | 4.6 | 6 | 5 | 1.72 | 12 | 260 |
| Example 13 | Yes | 150 | 6 | 30 | 4 | 1.72 | 25 | 210 |
| Example 14 | Yes | 110 | 2 | 20 | 10 | 1.74 | 30 | 180 |
| Example 15 | Yes | 80 | 4.5 | 2 | 3 | 1.70 | 4 | 70 |
| Example 16 | Yes | 80 | 4.5 | 2 | 3 | 1.70 | 4 | 70 |
| Comparative Example 8 | — | — | — | — | — | — | — | — |

| | Coefficient of thermal expansion (ppm/° C.) | Whether or not island domains with a diameter of 30 to 200 nm exist | Whether or not island domains with a diameter of 1 nm to less than 30 nm exist | Major axis/ minor axis | Young's modulus in machine direction Em [GPa] | Young's modulus in transverse direction Et [GPa] | Em/Et |
|---|---|---|---|---|---|---|---|
| Example 1 | 1.0 | Yes | Yes | 5 | 6.2 | 8.0 | 0.78 |
| Example 2 | 2.0 | Yes | Yes | 10 | 6.1 | 8.2 | 0.74 |
| Example 3 | −1.0 | Yes | Yes | 5 | 6.0 | 8.3 | 0.72 |
| Example 4 | 5.5 | Yes | Yes | 10 | 6.0 | 7.0 | 0.86 |
| Example 5 | 3.0 | Yes | Yes | 15 | 6.5 | 7.5 | 0.87 |
| Example 6 | −3.0 | Yes | Yes | 8 | 7.5 | 10.2 | 0.74 |
| Example 7 | 2.0 | Yes | Yes | 9 | 5.8 | 6.8 | 0.85 |
| Example 8 | −2.0 | Yes | Yes | 3 | 6.5 | 7.3 | 0.89 |
| Example 9 | 4.0 | Yes | Yes | 8 | 6.0 | 7.0 | 0.86 |
| Example 10 | 7.5 | Yes | Yes | 5 | 5.0 | 6.0 | 0.83 |
| Comparative Example 1 | 3.5 | No | No | — | 5.0 | 6.8 | 0.74 |
| Comparative Example 2 | — | — | — | — | — | — | — |
| Comparative Example 3 | 6.1 | Yes | No | 32 | 6.0 | 4.0 | 1.50 |
| Comparative Example 4 | — | — | — | — | — | — | — |
| Comparative Example 5 | 9.0 | No | Yes | 42 | 5.1 | 4.7 | 1.09 |
| Comparative Example 6 | 10.0 | Yes | Yes | 30 | 6.4 | 4.0 | 1.60 |
| Comparative Example 7 | 6.5 | No | Yes | 2 | 5.0 | 6.8 | 0.74 |
| Example 11 | 1.5 | Yes | Yes | 5 | 6.1 | 8.2 | 0.74 |
| Example 12 | 1.5 | Yes | Yes | 7 | 6.3 | 8.2 | 0.77 |
| Example 13 | 2.5 | Yes | Yes | 2 | 5.8 | 7 | 0.83 |
| Example 14 | 1.0 | Yes | Yes | 35 | 5.6 | 6.2 | 0.90 |
| Example 15 | −1 | Yes | Yes | 5 | 4.5 | 7.5 | 0.60 |
| Example 16 | −1 | Yes | Yes | 5 | 6 | 8.3 | 0.72 |
| Comparative Example 8 | — | — | — | — | — | — | — |

TABLE 2

| | Polyester as a main component | Resin of island domains | Glass transition temperature (° C.) | Island domain content (wt %) |
|---|---|---|---|---|
| Example 1 | PET | PEI "Ultem CRS5011-1000" produced by SABIC Innovative Plastics | 225 | 1 |
| Example 2 | PET | PEI "Ultem XH6050-1000" produced by SABIC Innovative Plastics | 245 | 1 |
| Example 3 | PET | PEI "Extem XH1015" produced by SABIC Innovative Plastics | 250 | 1 |
| Example 4 | PET | PEI "Ultem CRS5011-1000" produced by SABIC Innovative Plastics | 225 | 25 |
| Example 5 | PET | PEI "Ultem CRS5011-1000" produced by SABIC Innovative Plastics | 225 | 12 |
| Example 6 | PEN | PEI "Ultem CRS5011-1000" produced by SABIC Innovative Plastics | 225 | 1 |
| Example 7 | PET | PEI "Ultem CRS5011-1000" produced by SABIC Innovative Plastics | 225 | 1 |
| Example 8 | PET | PAI "TORON 4000T" produced by Solvay Advanced Polymers | 280 | 1 |
| Example 9 | PET | PES "RADEL A Grade A-300A" produced by Solvay Advanced Polymers | 220 | 1 |
| Example 10 | PET | PEI "Ultem CRS5011-1000" produced by SABIC Innovative Plastics | 225 | 32 |
| Comparative Example 1 | PET | Nil | — | — |
| Comparative Example 2 | PET | PEI "Ultem CRS5011-1000" produced by SABIC Innovative Plastics | 225 | 50 |
| Comparative Example 3 | PET | PSU "UDEL P-3900" produced by Solvay Advanced Polymers | 180 | 10 |
| Comparative Example 4 | PEN | PES "RADEL A Grade A-300A" produced by Solvay Advanced Polymers | 220 | 5 |
| Comparative Example 5 | PET | PAR "U Polymer U-100" produced by Unitika, Ltd. | 200 | 5 |
| Comparative Example 6 | PET | PEI "Ultem 1010-1000" produced by SABIC Innovative Plastics | 215 | 20 |
| Comparative Example 7 | PET | PEI "Ultem 1010-1000" produced by SABIC Innovative Plastics | 215 | 1 |
| Example 11 | PET | PEI "Ultem CRS5011-1000" produced by SABIC Innovative Plastics | 225 | 2.5 |
| Example 12 | PET | PEI "Ultem CRS5011-1000" produced by SABIC Innovative Plastics | 225 | 2.5 |
| Example 13 | PET | Polyetheretherketone (PEEK) "VICTREX PEEK 90G" produced by Victrex | 150 | 1 |
| Example 14 | PET | Polycarbonate (PC) "Calibre 301-4" produced by Sumitomo Dow | 155 | 1 |
| Example 15 | PET | PEI "Ultem CRS5011-1000" produced by SABIC Innovative Plastics | 225 | 2.5 |
| Example 16 | PET | PEI "Ultem CRS5011-1000" produced by SABIC Innovative Plastics | 225 | 2.5 |
| Comparative Example 8 | PET | Nil | — | — |

TABLE 3

| | Magnetic recording medium | | | | | |
|---|---|---|---|---|---|---|
| | Dimensional stability | Storage stability | Running durability | Electromagnetic conversion property | Electromagnetic conversion property after long-time storage | Running durability at high humidity after long-time storage |
| Example 1 | ◎ | ○ | ◎ | ○ | ◎ | 4 |
| Example 2 | ○ | ◎ | ◎ | ○ | ○ | 3 |
| Example 3 | ◎ | ○ | Δ | Δ | Δ | 3 |
| Example 4 | ○ | ○ | Δ | Δ | Δ | 3 |
| Example 5 | ◎ | ◎ | ○ | ○ | ○ | 3 |
| Example 6 | ◎ | ○ | ◎ | ○ | ◎ | 5 |
| Example 7 | ◎ | ○ | ○ | ○ | ◎ | 5 |
| Example 8 | ◎ | ○ | Δ | Δ | ○ | 4 |
| Example 9 | ○ | ○ | ○ | ○ | Δ | 2 |
| Example 10 | Δ | Δ | Δ | Δ | Δ | 2 |
| Comparative Example 1 | X | Δ | ◎ | ○ | ○ | 5 |
| Comparative Example 2 | — | — | — | — | — | — |
| Comparative Example 3 | X | Δ | ◎ | ○ | X | 1 |
| Comparative Example 4 | — | — | — | — | — | — |
| Comparative Example 5 | X | Δ | ◎ | Δ | Δ | 2 |
| Comparative Example 6 | X | X | X | X | X | 1 |
| Comparative Example 7 | X | Δ | ◎ | ○ | ◎ | 4 |
| Example 11 | ◎ | ◎ | ◎ | ○ | ◎ | 4 |
| Example 12 | ◎ | ◎ | ◎ | ○ | ○ | 2 |
| Example 13 | ○ | ○ | ◎ | Δ | Δ | 3 |
| Example 14 | Δ | Δ | ◎ | Δ | Δ | 4 |
| Example 15 | ◎ | ◎ | ◎ | ◎ | ◎ | 5 |
| Example 16 | ◎ | ◎ | ◎ | ◎ | ◎ | 5 |
| Comparative Example 8 | — | — | — | — | — | — |

MEANINGS OF SYMBOLS

1: laser oscillator
2: light receiving unit
3: load detector
4: load
5: free roll
6: free roll
7: free roll
8: free roll
9: magnetic tape
10: laser light

The invention claimed is:

1. A biaxially oriented polyester film comprising at least two polyetherimides and an islands-in-sea structure with an average island domain size of 30 to 200 nm, and a coefficient of hygroscopic expansion of 0 to 6 ppm/% RH at least either in a machine direction or in a transverse direction or' the film, wherein an amorphous resin forming the island domains with a diameter of 30 to 200 nm contains at least one resin selected from the group consisting of polyetherimides, polyimides and polyamideimides, glass transition temperature of the amorphous resin forming the island domains with a diameter of 30 to 200 nm is 220 to 245 degrees centigrade, and total mass of the island domains with a diameter of 30 to 200 nm is 0.5 to 15 mass %.

2. The biaxially oriented, polyester film according to claim 1, wherein haze value inside the film is 0 to 50%.

3. The biaxially oriented polyester film according to claim 1, wherein mean value of a refractive index in the machine direction and a refractive index in the transverse direction is 1.600 to 1.850.

4. The biaxially oriented polyester film according to claim wherein roughness Ra of surface of the film at least on one side is 0.5 to 2.0 nm.

5. The biaxially oriented polyester film according to claim 1, wherein a ten-point mean roughness Rz of a surface of the film at least on one side is 50 to 300 nm.

6. The biaxially oriented polyester film according to claim 1, wherein a coefficient of thermal expansion at least either in the machine direction or in the transverse direction is −5.0 to 8.0 ppm/° C.

7. The biaxially oriented polyester film according to claim 1, which has island domains with a diameter of 30 to 200 nm, and a mean value of ratios of major axes to minor axes (each ratio=major axis/minor axis) of the island domains is 1 to 20.

8. The biaxially oriented polyester film according to claim 1, which has island domains with a diameter of 1 nm to smaller than 30 nm.

9. The biaxially oriented polyester film according, to claim 8, wherein the island domains with a diameter of 1 nm to smaller than 30 nm contain a polyetherimide.

10. The biaxially oriented polyester film according to claim 1, comprising a crystalline polyester, the polyester being at least one polyester selected from the group consisting of polyethylene terephthalate, polyethylene-2,6-napthalate and modification products thereof.

11. A magnetic recording medium comprising a biaxially oriented polyester film comprising at least two polyetherimides and an islands-in-sea structure with an average island domain size of 30 to 200 nm, and a coefficient of hygroscopic expansion of 0 to 6 ppm/% RH at least either in a machine direction or in a transverse direction of the film, wherein an amorphous resin forming the island domains with a diameter of 30 to 200 nm contains at least one resin selected from the group consisting of polyetherimides, polyimides and polyamideimides, glass transition temperature of the amorphous resin forming the island domains with a diameter of 30 to 200 nm is 220 to 245 degrees centigrade, and total mass of the island domains with a diameter of 30 to 200 nm is 0.5 to 15 mass %.

* * * * *